United States Patent
Tappeiner et al.

(10) Patent No.: US 11,027,213 B2
(45) Date of Patent: Jun. 8, 2021

(54) MOBILE AGENTS FOR MANIPULATING, MOVING, AND/OR REORIENTING COMPONENTS

(71) Applicant: Digital Dream Labs, LLC, Pittsburgh, PA (US)

(72) Inventors: Hanns Tappeiner, San Francisco, CA (US); Boris Sofman, San Francisco, CA (US); Patrick DeNeale, San Francisco, CA (US)

(73) Assignee: Digital Dream Labs, LLC, Pittsburgh, PA (US)

( * ) Notice: Subject to any disclaimer, the term of this patent is extended or adjusted under 35 U.S.C. 154(b) by 348 days.

(21) Appl. No.: 15/924,060

(22) Filed: Mar. 16, 2018

(65) Prior Publication Data

US 2018/0207541 A1 Jul. 26, 2018

Related U.S. Application Data

(63) Continuation of application No. 14/843,591, filed on Sep. 2, 2015, now Pat. No. 9,919,232, which is a (Continued)

(51) Int. Cl.
*A63H 30/00* (2006.01)
*B25J 9/16* (2006.01)
(Continued)

(52) U.S. Cl.
CPC ............ *A63H 30/02* (2013.01); *A63F 13/00* (2013.01); *A63F 13/30* (2014.09); *A63H 17/40* (2013.01);
(Continued)

(58) Field of Classification Search
CPC ........ A63H 30/02; A63H 33/04; A63H 30/04; A63H 17/40; A63H 18/16; A63H 33/042;
(Continued)

(56) References Cited

U.S. PATENT DOCUMENTS 4,307,791 A 12/1981 De Bruine
4,658,928 A 4/1987 Seo
(Continued)

FOREIGN PATENT DOCUMENTS

DE 19532540 3/1997
DE 202004018425 4/2006
(Continued)

OTHER PUBLICATIONS

Japanese Office Action in Application No. 2016-251422, dated Dec. 19, 2017, 7 pages.
(Continued)

*Primary Examiner* — Jason Holloway
(74) *Attorney, Agent, or Firm* — David G. Oberdick

(57) ABSTRACT

Mobile agents automatically manipulate components such as blocks on a working surface, to perform operations such as construction of generalized structures. The working surface and/or the components can have machine-readable codes to assist the agents in maintaining current knowledge of their respective locations. Agents identify components by type and location, and can move components according to directions; such directions can be provided by a user, or can be based on a pre-programmed directive, or can be determined dynamically based on current conditions or in response to actions of other agents. Agents may cooperate with one another. Agents can also respond to changes in the environment, alterations in works in progress, and/or other conditions, and may be configured to exhibit responses simulating emotional reactions. Different mobile agents can be associated with different character traits, which may be configured to change based on environmental conditions and/or the behavior of other mobile agents.

38 Claims, 20 Drawing Sheets

Related U.S. Application Data continuation of application No. 14/291,513, filed on May 30, 2014, now Pat. No. 9,155,961, which is a continuation-in-part of application No. 13/963,638, filed on Aug. 9, 2013, now Pat. No. 8,882,560, which is a continuation-in-part of application No. 13/707,512, filed on Dec. 6, 2012, now Pat. No. 8,747,182, which is a continuation of application No. 12/788,605, filed on May 27, 2010, now Pat. No. 8,353,737.

(60) Provisional application No. 61/829,419, filed on May 31, 2013, provisional application No. 61/693,687, filed on Aug. 27, 2012, provisional application No. 61/261,023, filed on Nov. 13, 2009, provisional application No. 61/181,719, filed on May 28, 2009.

(51) Int. Cl.

| | | |
|---|---|---|
| *A63H 30/02* | (2006.01) | |
| *G05D 1/00* | (2006.01) | |
| *B25J 9/08* | (2006.01) | |
| *A63H 33/04* | (2006.01) | |
| *A63H 30/04* | (2006.01) | |
| *A63H 17/40* | (2006.01) | |
| *A63H 18/16* | (2006.01) | |
| *A63F 13/30* | (2014.01) | |
| *A63F 13/00* | (2014.01) | |
| *A63H 17/32* | (2006.01) | |

(52) U.S. Cl.
CPC ............ *A63H 18/16* (2013.01); *A63H 30/04* (2013.01); *A63H 33/04* (2013.01); *B25J 9/08* (2013.01); *B25J 9/1617* (2013.01); *G05D 1/0088* (2013.01); *A63H 17/32* (2013.01); *A63H 33/042* (2013.01); *A63H 33/046* (2013.01); *G05B 2219/39146* (2013.01); *G05B 2219/40109* (2013.01); *G05B 2219/40302* (2013.01)

(58) Field of Classification Search
CPC ....... A63H 33/046; A63H 17/32; A63F 13/30; A63F 13/00; B25J 9/1617; B25J 9/08; G05D 1/0088; G05B 2219/39146; G05B 2219/40109; G05B 2219/40302
See application file for complete search history.

(56) References Cited

U.S. PATENT DOCUMENTS

| | | | |
|---|---|---|---|
| 5,203,733 | A | 4/1993 | Patch et al. |
| 5,361,186 | A | 11/1994 | Tanie et al. |
| 5,452,901 | A | 9/1995 | Nakada et al. |
| 5,697,829 | A | 12/1997 | Chainani et al. |
| 5,989,096 | A | 11/1999 | Barton et al. |
| 6,012,957 | A | 1/2000 | Cyrus et al. |
| 6,157,872 | A | 12/2000 | Michael |
| 6,254,478 | B1 | 7/2001 | Namanny et al. |
| 6,477,444 | B1 | 11/2002 | Bennett et al. |
| 6,491,566 | B2 | 12/2002 | Peters et al. |
| 6,636,781 | B1 | 10/2003 | Shen et al. |
| 6,725,128 | B2 | 4/2004 | Hogg et al. |
| 6,783,425 | B2 | 8/2004 | McKeefery |
| 6,842,246 | B2 | 1/2005 | Roufas et al. |
| 6,965,668 | B2 | 11/2005 | Clark et al. |
| 7,076,331 | B1 | 7/2006 | Nagatsuka |
| 7,097,532 | B1 | 8/2006 | Rolicki et al. |
| 7,753,756 | B2 | 7/2010 | McDermott et al. |
| 7,778,730 | B2 | 8/2010 | Lee |
| 7,787,990 | B2 | 8/2010 | Pietrzyk |
| 8,160,994 | B2 | 4/2012 | Ong et al. |
| 8,204,839 | B2 | 6/2012 | Lee |
| 8,287,372 | B2 | 10/2012 | Hong et al. |
| 8,353,737 | B2 | 1/2013 | Sofman et al. |
| 8,666,547 | B2 | 3/2014 | Cheung et al. |
| 8,851,953 | B2 | 10/2014 | Oschuetz et al. |
| 8,996,429 | B1* | 3/2015 | Francis, Jr. ........... G06F 16/214 706/12 |
| 9,067,145 | B2* | 6/2015 | Sofman ................. A63F 13/65 |
| 9,155,961 | B2 | 10/2015 | Tappeiner |
| 9,919,232 | B2* | 3/2018 | Tappeiner ............ G05D 1/0088 |
| 2002/0102910 | A1 | 8/2002 | Donahue et al. |
| 2002/0115373 | A1 | 8/2002 | Lazerman |
| 2002/0137427 | A1 | 9/2002 | Peters et al. |
| 2003/0040250 | A1 | 2/2003 | Yim |
| 2003/0045203 | A1 | 3/2003 | Sabe |
| 2003/0060287 | A1 | 3/2003 | Nishiyama |
| 2003/0097203 | A1 | 5/2003 | Michael |
| 2003/0109958 | A1 | 6/2003 | Hogg et al. |
| 2003/0148698 | A1 | 8/2003 | Koenig |
| 2003/0232649 | A1 | 12/2003 | Gizis et al. |
| 2004/0068415 | A1 | 4/2004 | Solomon |
| 2004/0134336 | A1 | 7/2004 | Solomon |
| 2004/0134337 | A1 | 7/2004 | Solomon |
| 2004/0162638 | A1 | 8/2004 | Solomon |
| 2004/0210347 | A1 | 10/2004 | Sawada et al. |
| 2004/0266506 | A1 | 12/2004 | Herbrich et al. |
| 2005/0186884 | A1 | 8/2005 | Evans |
| 2006/0041332 | A1 | 2/2006 | Sabe |
| 2006/0073760 | A1 | 4/2006 | Tremel et al. |
| 2006/0073761 | A1 | 4/2006 | Weiss et al. |
| 2006/0095159 | A1 | 5/2006 | Desmond |
| 2006/0223637 | A1 | 10/2006 | Rosenberg et al. |
| 2007/0017984 | A1 | 1/2007 | Mountz et al. |
| 2007/0021863 | A1 | 1/2007 | Mountz et al. |
| 2007/0021864 | A1 | 1/2007 | Mountz et al. |
| 2007/0173171 | A1 | 7/2007 | Benedek et al. |
| 2007/0173177 | A1 | 7/2007 | Hirokawa et al. |
| 2007/0293124 | A1 | 12/2007 | Smith et al. |
| 2008/0026671 | A1 | 1/2008 | Smith et al. |
| 2008/0108277 | A1 | 5/2008 | Serrano et al. |
| 2008/0195566 | A1 | 8/2008 | Lee |
| 2009/0004948 | A1 | 1/2009 | Ando et al. |
| 2009/0076784 | A1 | 3/2009 | Ong et al. |
| 2009/0111356 | A1 | 4/2009 | Haass et al. |
| 2009/0192649 | A1* | 7/2009 | Yen ........................ G06N 3/008 700/253 |
| 2009/0265642 | A1 | 10/2009 | Carter et al. |
| 2009/0284553 | A1 | 11/2009 | Seydoux |
| 2010/0093255 | A1 | 4/2010 | Yamamoto |
| 2010/0099493 | A1 | 4/2010 | Horovitz |
| 2010/0178966 | A1 | 7/2010 | Seydoux |
| 2010/0203933 | A1 | 8/2010 | Eyzaguirre et al. |
| 2010/0230198 | A1 | 9/2010 | Frank et al. |
| 2010/0304640 | A1* | 12/2010 | Sofman .................. A63H 18/12 446/456 |
| 2011/0144804 | A1 | 6/2011 | Song |
| 2012/0157206 | A1 | 6/2012 | Crevin et al. |
| 2012/0238366 | A1 | 9/2012 | Tedder |
| 2013/0109267 | A1* | 5/2013 | Schweikardt .......... A63H 33/04 446/85 |
| 2013/0183882 | A1 | 7/2013 | Oschuetz |
| 2013/0190090 | A1 | 7/2013 | Lin |

FOREIGN PATENT DOCUMENTS

| | | |
|---|---|---|
| EP | 1103351 | 8/2001 |
| GB | 2385238 | 8/2003 |
| JP | H6-170770 | 6/1994 |
| JP | H06-170770 | 6/1994 |
| JP | 7016348 | 1/1995 |
| JP | 2001-022264 | 1/2001 |
| JP | 2003-346240 | 12/2002 |
| JP | 2004-298475 | 10/2004 |
| JP | 2005-063057 | 3/2005 |
| JP | 2005-185655 | 7/2005 |
| JP | 2009-291540 | 12/2009 |
| KR | 100842566 | 7/2008 |
| WO | WO 2008/039934 | 4/2008 |
| WO | WO 2009/037677 | 3/2009 |

(56) References Cited

FOREIGN PATENT DOCUMENTS

OTHER PUBLICATIONS

Valk, "Lego Mindstorms NXT 2.0 Discovery Book: A Beginner's Guide to Building and Programming Robots", 2010, pp. 27, 99, 244, 277-279, 312, 314, 316, 319-347.rittps:1/www.dropbox.com/s/c1 adrf713exwik5/LEGO MI NDSTORMS_NXT 2doto Discovery_Book.pdf?dl=O.

Zlot et al., "Multi-Robot Exploration Controlled by a Market Economy", 2009 IEEE, 9 pages.

\* cited by examiner

| | PERSONALITY | $t_s$ | $A_r$ | POSITIVE EMOTIONAL EXPRESSION | POSITIVE PHYSICAL ACTION | NEGATIVE EMOTIONAL EXPRESSION | NEGATIVE PHYSICAL ACTION | MODERATION RESPONSE | CONFUSED RESPONSE |
|---|---|---|---|---|---|---|---|---|---|
| A | Extroverted Positive (enthusiastic, bubbly) | 45s | 5 | Excitement | Cheer/trill, RESUME TASK and travel quickly in flourished route to destination | Sympathetic disappointment, reset A to zero, REPEAT REQUEST, do not increment A | Drive toward user and offer encouraging words of support | Encourage user that user performance is bound to improve | |
| B | Sensitive Positive (shy) | 90s | 2 | Suppressed glee | Short sigh of relief and happy beep | Dejection | Retreat to corner of mat and enter 'Sulk' state | <none> | |
| C | Reserved Positive | 120s | 4 | Polite gratitude | Courteous nod | <none> | Face user and politely remind user of request | Thank user for eventually satisfying request | |
| D | Reserved Neutral (Stoic) | 180s | 3 | <none> | <none> | <none> | <none> | <none> | |
| E | Cynical Negative | 60s | 2 | Surprise | Pessimistic Muttering | Griping over poor treatment as typical | Grumbling to self while driving in circles | Sarcastically educate user about user's role | |
| F | Sensitive Negative (temperamental, impatient) | 30s | 1 | Satisfied chirp | Proudly and smugly driving to destination (slowly and with some extravagance of motion) | Loud complaining to user and threats to other mobile agents | Tirade at user, driving back-forth, knocking down completed work, disrupting others | Chastisement of user for poor management, demands for improvement | |

MOBILE AGENTS FOR MANIPULATING, MOVING, AND/OR REORIENTING COMPONENTS

CROSS-REFERENCE TO RELATED APPLICATIONS

The present application claims priority as a continuation of U.S. Utility application Ser. No. 14/843,591 for "Mobile Agents for Manipulating, Moving, and/or Reorienting Components", filed on Sep. 2, 2015, which is a continuation of U.S. Utility application Ser. No. 14/291,513 for "Mobile Agents for Manipulating, Moving, and/or Reorienting Components", filed on May 30, 3014 and issued on Oct. 13, 2015 as U.S. Pat. No. 9,155,961, which claims priority from U.S. Provisional Application Ser. No. 61/829,419 for "Mobile Agents for Constructing Generalized Structures", filed on May 31, 2013. All of these applications are incorporated herein by reference.

While the claimed invention does not claim priority to the following United States Patents and Applications, the present specification relates back to the following United States Patents and Applications. U.S. Utility application Ser. No. 14/291,513 further claims priority as a continuation-in-part of U.S. Utility application Ser. No. 13/963,638 for "Integration of a Robotic System with One or More Computing Devices", filed on Aug. 9, 2013 and issued on Nov. 11, 2014 as U.S. Pat. No. 8,882,560. U.S. Utility application Ser. No. 13/963,638 claims priority from U.S. Provisional Application Ser. No. 61/693,687 for "Integration of a Robotic System with One or More Mobile Computing Devices", filed on Aug. 27, 2012. U.S. Utility application Ser. No. 13/963,638 further claims priority as a continuation-in-part of U.S. Utility application Ser. No. 13/707,512 for "Distributed System of Autonomously Controlled Mobile Agents", filed on Dec. 6, 2012 and issued on Jun. 10, 2014 as U.S. Pat. No. 8,747,182, which claims priority as a continuation of U.S. Utility application Ser. No. 12/788,605 for "Distributed System of Autonomously Controlled Toy Vehicles", filed on May 27, 2010 and issued on Jan. 15, 2013 as U.S. Pat. No. 8,353,737. U.S. Utility application Ser. No. 12/788,605 claims priority from U.S. Provisional Patent Application Nos. 61/181,719, filed on May 28, 2009, and 61/261,023, filed on Nov. 13, 2009. All of these applications are incorporated herein by reference.

TECHNICAL FIELD

The present document relates to mobile agents that are capable of constructing generalized structures.

BACKGROUND

Blocks in some form are often among the first toys a child receives; block-based games such as Jenga remain popular well into adulthood. Common to both blocks as products intended for entertainment and those used for the construction of human-scale infrastructure is the dependence on human control or manipulation of some form to execute the tasks involved in construction (or disassembly, in some cases). Put another way, block-based structures are not generally able to build or deconstruct themselves.

In addition, conventional systems and building-block toys do not provide any techniques where a plurality of mobile agents can work together and interact in a collaborative manner to complete a construction project. Nor do they have any mechanisms that provide or simulate emotional responses that affect the manner of such collaboration and interaction. Because of such limitations, the level of engagement and interest in such systems and toys is often quite limited.

SUMMARY

Various embodiments provide mechanisms for manipulating, moving, and/or reorienting components such as blocks, for example to construct generalized structures. In at least one embodiment, mobile agents (also referred to as robots) operate on a working surface that bears marks (or other machine-readable codes) which assist the mobile agents in maintaining current knowledge of their respective locations on the working surface. Mobile agents identify components by type and location in their environment and use onboard hardware to relocate or reposition components according to directions; such directions can be provided by a user, or can be based on a pre-programmed or pre-planned directive, or they can be determined dynamically based on current conditions or in response to actions of other agents. Executed by mobile agents either cooperatively or individually, these tasks can be part of a larger, organized sequence of objectives executed either sequentially or in parallel to place components (such as blocks) in arrangements. Such operations can have the goal of building a structure, and/or other goals and/or directives, or they can have no goals.

In at least one embodiment, mobile agents are responsive to changes in the environment, alterations in any works in progress, and/or other conditions. In response to such changes and conditions, such agents may be configured to exhibit responses projecting or simulating emotional reactions; for example, the agents may react in a manner that is consistent with various events, both planned and unexpected, that may occur in the process of executing their tasks. Different mobile agents can be associated with different character traits and/or temperaments, which may be static or dynamic, and which may be configured to change based on environmental conditions and/or the behavior of other mobile agents. The mobile agents can further be configured to detect environmental conditions (such as positions of blocks and other components, positions and movement of other mobile agents, temperature, terrain, goals, obstacles, behaviors of human users, and/or the like) using any suitable technique, including for example visual detection, auditory detection, proximity detection, motion detection, direct communication with a basestation and/or with other mobile agents, and/or the like, and/or any combination thereof.

By providing mobile agents with any or all of the above features, either alone or in any suitable combination, the behaviors and interactions of the various mobile agents can provide improved levels of interest and engagement with toys and systems that are implemented according to the techniques described herein.

Further details and variations are described herein.

BRIEF DESCRIPTION OF THE DRAWINGS

The accompanying drawings illustrate several embodiments. Together with the description, they serve to explain the principles and operational mechanics of the embodiments. One skilled in the art will recognize that the particular embodiments illustrated in the drawings are merely exemplary, and are not intended to limit scope.

FIG. 2 is a table depicting a set of responses and parameters that inform actions according to a generalized personality type, according to one embodiment.

DETAILED DESCRIPTION

Figure 1:
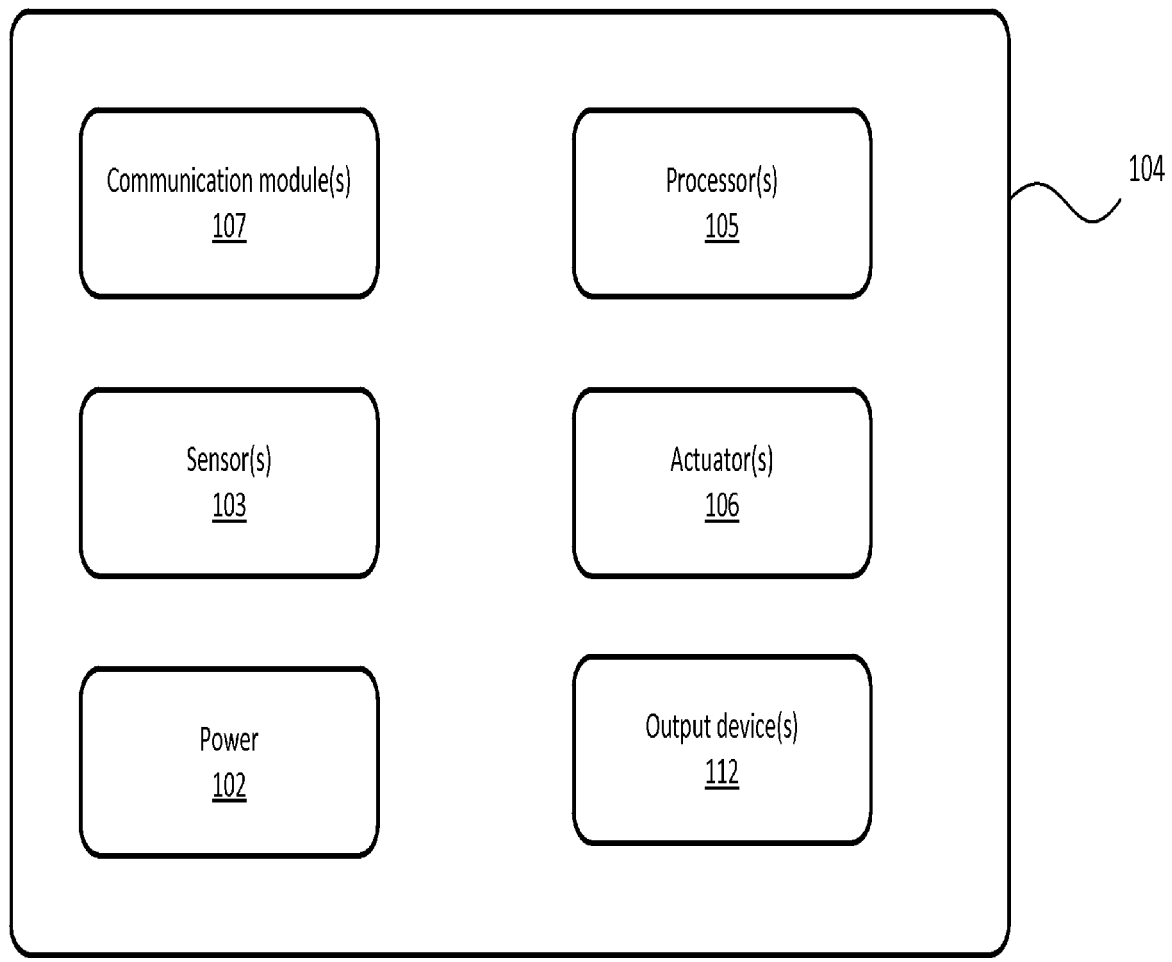
FIG. 1 is a block diagram depicting a mobile agent according to one embodiment.

For illustrative purposes, the systems and methods described and depicted herein may refer to mobile agents for constructing structures in the context of a toy having, as its primary purpose, the goal of entertaining the user. However, one skilled in the art will recognize that the techniques described herein can be applied to many different contexts and environments wherein it may be useful or desired to provide mobile agents that can construct structures, display emotions, cooperate, compete, and/or perform other actions. According, the techniques described herein are intended to be applicable to any such context or environment, and are not intended to be limited to the specific implementations presented herein.

In addition, the following description sets forth many different concepts, features, and mechanisms that can be implemented singly or in various combinations. One skilled in the art will recognize that various embodiments can be implemented using one or more of such concepts, features, and mechanisms using any suitable combination.

For purposes of the following description, the term "component" is intended to apply to any of a number of different types of individual blocks and/or other elements. As described in more detail below, components can be classified as belonging to one of three types: passive, semi-active and active. In addition, the use of the term "block" or "component" should not be considered limiting, and in particular does not necessitate that the component should appear in a form consistent with the geometry or composition fitting conventional notions of a block. For example, while the working surface is unlikely to bear resemblance to a conventional block shape, in terms of role and function, it fits within the category of passive component types, as will be discussed below. In addition, as described below, mobile agents can be considered a type of component.

In terms of classification, dividing components into three component types offers convenient ordering and reference in discussing the consistencies within and distinctions among the classes; however such classifications are optional and should not be considered to limit the scope. As described in more detail below, the various classifications of components have particular characteristics and differences that may be useful to understanding their roles with respect to each to each other and within the overall system, as well as the nature of system as a whole.

Various elements of the system can be viewed in a unified framework operating within the construct of a single system. In at least one embodiment, the system can include components of various types and degrees of autonomy and functionality that can be tasked with building a structure of themselves. One or more users may participate in this activity, by providing a desired finished design, and/or by providing high level instructions for directing mobile agents capable of transporting and placing components (such as blocks), and/or by directly controlling the discrete actions of individual agents.

In various embodiments, user(s) can interact with the system and/or with individual agents using any suitable communication mechanism and/or user interface mechanism. In at least one embodiment, the system supports a robust interface between users and mobile agents via any suitable device (or more than one device) such as, for example, a tablet computer, smartphone, and/or other mobile computing device. In at least one embodiment, a touch-based screen interface or other direct-manipulation interface is supported, although any other type of user interface can be used. In alternative embodiments, other types of interface mechanisms can be supported, such as for example speech input, text-based input, mouse-based input, joystick input, and/or the like. Any such input mechanism, along with suitable output mechanism(s) and/or feedback, can be used to provide a graphical (or non-graphical) interface. The agents of the system can operate with any suitable and desired degree of autonomy and/or under any suitable and desired level of user control.

In at least one embodiment, the system includes a working surface such as a mat. The mat may bear machine-readable codes 601, or marks, that encode locational information usable by the mobile agents to determine their positions via sensors (such as optical sensors) on the mobile agents.

Figure 18:
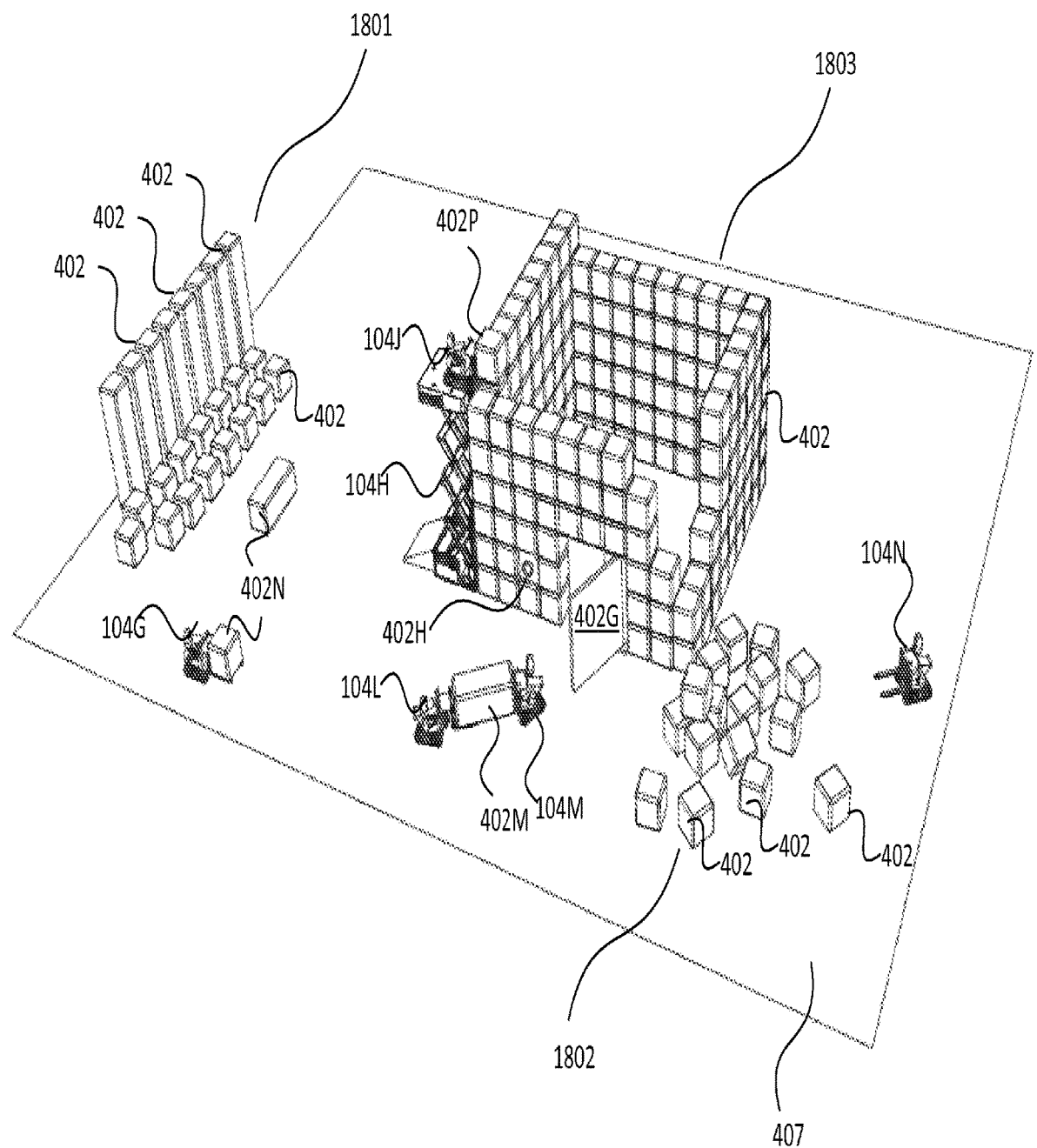
FIG. 18 depicts an example of several mobile agents manipulating components on a working surface, according to one embodiment.

Referring now to FIG. 18, there is shown an example wherein several mobile agents 104 are in the process of manipulating various components 402 (shown as blocks) on a working surface 407, according to one embodiment. As can be seen from the example, the various mobile agents 104 may work in cooperation with one another; alternatively, they may work separately from one another or may even interfere and/or compete with one another. Manipulation of components 402 can include construction of structures, as well as destruction or any other suitable manipulation. Components 402 can take many different forms, as discussed in more detail below, and need not be blocks.

FIG. 18 depicts several examples of interactions and behaviors of agents 104 with respect to surface 407 and components 402, many of which are described in more detail herein. In the example of FIG. 18, some components 402 are kept in a block supply area 1801 from which agents 104 can take components 402 as needed for construction projects. Agent 104G is in the process of transporting component 402N from supply area 1801 to a building area 1803 where a construction project is ongoing. In at least one embodiment, surface 407 may contain markings or codes that define distinct zones for transit and for building, so that such an agent 104G might use a transit corridor when transporting a component such as 402N in this manner.

As a further example, FIG. 18 depicts agent 104J using a scissor lift 104H (which may itself be a tool operated by agent 104J, or it may be an agent itself) to place component 402P on a row that would otherwise be too high to reach. FIG. 18 further depicts an active component 402G (active components are described in further detail below) implemented as a functional door. In this example, the door of active component 402G can open when it receives a signal active component 402H, which is implemented as a distance sensor that sends a signal when an object (such as an agent 104 or other component 402) is detected within a threshold distance. Any suitable mechanism for proximity or motion detection can be used, such as for example reflected light, ultrasonic sound, Bluetooth proximity, and/or the like. In this example, agents 104L, 104M cooperating to carry component 402M activate the distance sensor of component 402H, causing component 402H to emit a signal indicating detection of an object. Door of component 402G responds by opening, allowing agents 104L, 104M to proceed into the structure.

FIG. 18 also shows agent 104N surveying a collapse 1802 of components 402, which may create an inconsistency between the physical environment and the virtual model of it. As described in more detail below, the system can react to such detected inconsistencies by, for example, making an adjustment to the virtual environment based on detected state of the physical environment, or by making physical adjustments (for example by moving agents 104 and/or components 402) to cause the physical environment to comport with the virtual environment.

In at least one embodiment, mobile agents 104 may communicate with one another so as to ascertain their relative locations with respect to one another and/or with respect to surface 407. In at least one embodiment, surface 407 is implemented as a rollable or foldable mat so as to provide for convenient storage and unpacking; alternatively, surface 407 may be rigid or may have a number of interlocking pieces.

Working surface 407 is intended to provide the area on which components 402 (such as blocks) may be manipulated and assembled. In at least one embodiment, working surface 407, once deployed, provides a substantially flat area for assembling components 402. However, in at least one embodiment, no special surface need be provided, and components 402 may be manipulated and assembled on a floor, table, or any other available conventional surface. In addition, in at least one embodiment, the system facilitates component functionality beyond the limits of working surface 407. In other embodiments, component configurations can accommodate a variable surface; for example, working surface 407 can span interconnected distinct flat (and/or non-flat) areas at various elevations.

Figure 14:
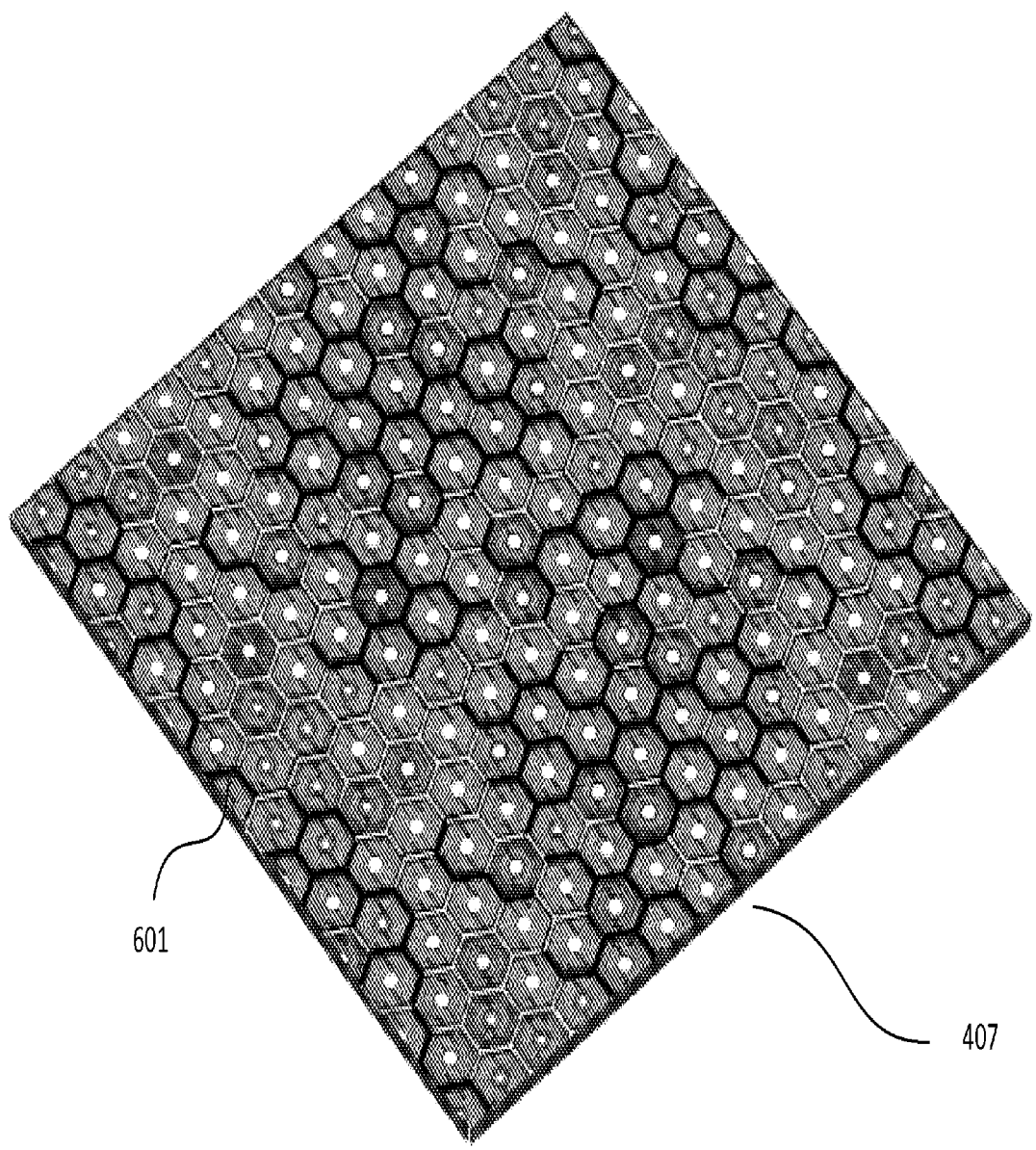
FIG. 14 depicts an example of a working surface with machine-readable codes, according to one embodiment.

For illustrative purposes, working surface 407 is shown in FIG. 18 as a plain rectangular surface with no markings. However, in at least one embodiment, working surface 407 may include machine-readable codes and/or other markings. Referring now to FIG. 14, there is shown an example of working surface 407 including machine-readable codes 601. In this example, surface 407 includes a hexagonal grid; however, one skilled in the art will recognize that any other arrangement is possible, including other types of grids or no grid at all. In addition, codes 601 can take any suitable form, and need not resemble the particular codes 601 shown in FIG. 14.

Passive Components 402

Figure 4:
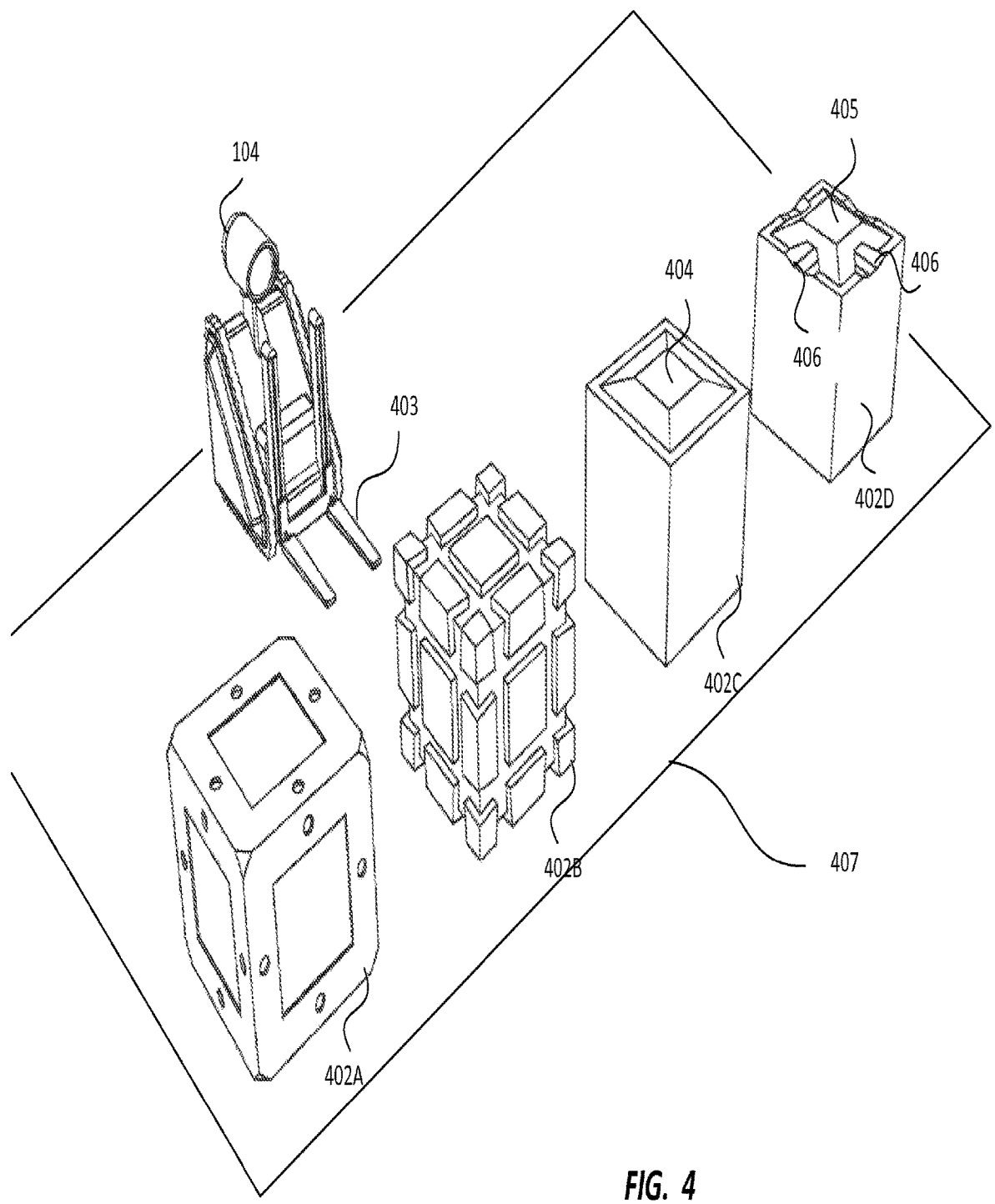
FIG. 4 depicts examples of features that may be characteristics of some component types according to one embodiment.

Referring now to FIG. 4, there are shown some examples of passive components 402A through 402D atop a working surface 407, implemented as blocks and having exemplary features that may be characteristics of some component types according to at least one embodiment. FIG. 4 also depicts an example of a mobile agent 104 that is equipped with a fork-type hoist 403.

Passive components 402 include elements that are functionally inert. One example of such components are inert blocks, which may be cubes, rectangular cuboids, or of any other suitable shape. These elements may have marks that make them useful to other elements in the system, and/or they may serve a structural role. In general, passive components are incapable of any change of state.

Figure 17A:
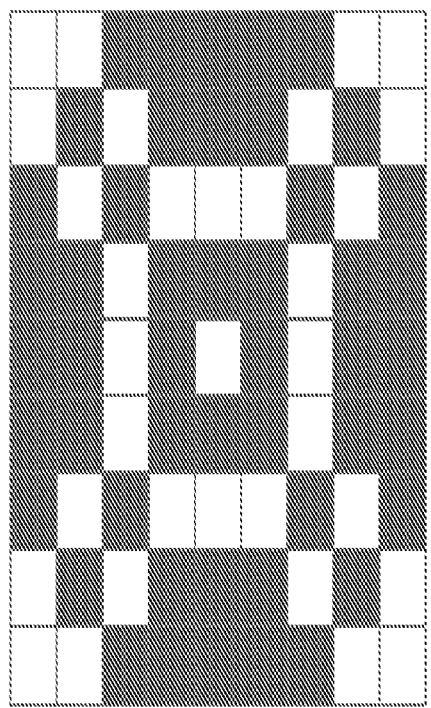
FIGS. 17A and 17B depict examples of machine-readable codes, according to various embodiments.
Figure 17B:
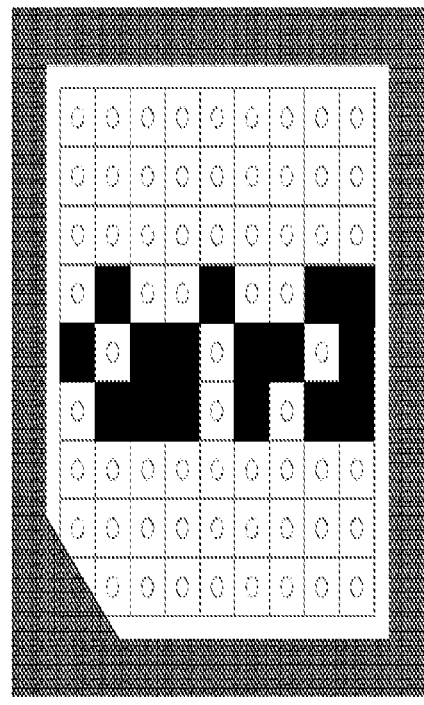

In various embodiments, relevant data concerning a passive component 402 can be stored and/or encoded in any suitable manner, including any form of machine-readable code affixed to, printed on, or disposed proximate to component 402; such a code can include any or all of optically or magnetically readable marks, RFID tags, and/or the like. Referring now to FIGS. 17A and 17B, there are shown examples of machine-readable codes 601, according to various embodiments; however, in other embodiments, machine-readable codes can take any suitable form. Storing and/or encoding such relevant data, using any suitable means, permits reading or decoding of such data by mobile agents 104 working with the component 402, manipulating the component 402, and/or operating in the environment around the component 402. Such embodiments support the function of an external agent or other entity, while the component 402 remains a passive element. Likewise, while in some embodiments, passive components 402 can be used for building and may be placed in various positions or orientations, and/or stacked in arrangements with peer components 402 of similar or other classes, this role is a passive one and such components 402 would still be classed as passive.

Passive components 402 may resemble semi-active or active components 402 in terms of having interfacing elements that may facilitate alignment during placement and provide some degree of fixity or passive interlock (e.g., gravity fit) with adjoining components 402; in general, however, passive components 402 lack any functional electronics or operable mechanisms (or if they do contain such elements, the elements are nonfunctional or perform operations unrelated to the operations described herein).

Component 402B is an example of a component 402 having surface geometry. In this case, the surface geometry is configured to accommodate the forks of hoist 403 regardless of which of the component's 402B faces is oriented downward or which edge is orthogonally presented toward the forks. Component 402C is another example, having a raised geometric feature 404 extending from its top surface that would fit the inversion of this form on its base (thereby permitting components of this design to stack with an interlock). Component 402D is yet another example, having a raised geometric feature 405 similar to feature 404 of component 402C, with the addition of slotted openings 406 at the base of geometric feature 405, facilitating lifting of the component 402 from the top.

In terms of performance within the preferred embodiment, working surface 407 can also be considered a passive component 402. Working surface 407 can include marks, machine-readable codes, RFID tags, and/or any other suitable elements that facilitate navigation of mobile agents 104 and placement of components 402 on surface 407.

Semi-Active Components

Semi-active components 402 include a range of potential component types. For purposes of the description herein, a semi-active component 402 may have similar basic properties as passive components 402, but may also possess functionality that may be controlled by users and/or mobile agents 104. For example, a semi-active component 402 may be capable of undergoing a mechanical or other state change. An example of such a component 402 is one that has a mechanical system that permits interlocking with another component 402. In such a scenario, a mobile agent 104 can be configured with a manipulator disposed to operating the semi-active component 402. For example, a rotatable extension rod can plug into a socket on the component 402; by turning the socket, the mobile agent 104 can engage interlock pieces that latch to a surface feature on one or more neighboring components 402. A similar result can be achieved with magnets providing the bonding force between components 402; in this case, mobile agents 104 tasked with manipulating components 402 can employ a magnetic coil with a ferrite core at the end of a manipulator alternatively to permit a magnet contained in the component 402 to attach to the arm or to release said magnet by sending current through the coil. Other configurations are possible, wherein one or more semi-active components 402 contain(s) one or more element(s) that are capable of a state change.

Figure 5:
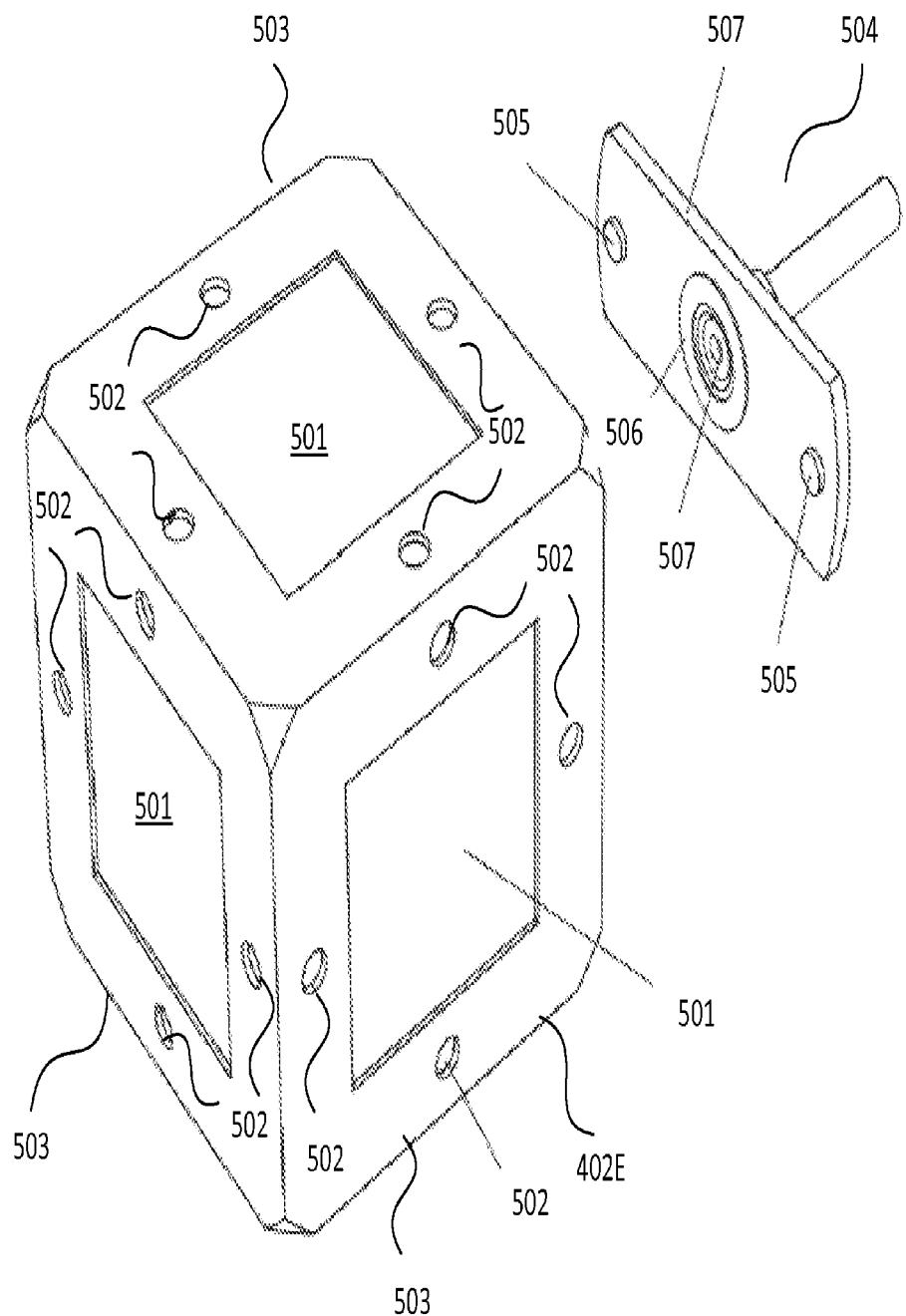
FIG. 5 depicts an example of a block component with a rectangular recess centrally located on each face and a circular recess offset from each edge, according to one embodiment.

Referring now to FIG. 5, there is shown an example of a block component 402E having a rectangular or square recess 501 centrally located on each face 503 and a circular recess 502 offset from each edge. A ferrous panel (not shown) can be fixed within each recess 501 such that any identifying marks or features potentially present on the face of the recess 501 would be less prone to scratching or abrasion with neighboring surfaces were it mounted flush.

FIG. 5 also depicts manipulation tool, or manipulator 504, presumably mounted or otherwise controlled by a mobile agent (not shown) tasked with positioning components such as block component 402E. In this case, manipulator 504 bears protrusions 505 of the corresponding size and spacing to mate with circular recesses 502 on face 503 of component 402E. At the center of manipulator 504 is a ring element 506 that may be a permanent magnet or a ferrous material that is configured to operate as an electromagnet, set proud of its mounting surface 507 to assure contact with recess 501 of component 402E. When manipulator 504 is applied to component 402E, the attractive force created through magnetic attraction between ring element 506 and recess 501 panel creates a degree of fixity between the two, and thereby enables a mobile agent controlling manipulator 504 to move, lift, or otherwise manipulate component 402E. The mating geometries between recesses 502 and protrusions 505 provide an assurance of consistency and predictability on the position and orientation of component 402E relative to manipulator 504 when interlocked with one another. One skilled in the art will appreciate the importance of maintaining precision in moving and placing a component 402 such as component 402E in space relies on an awareness of the component's 402 relative position with respect to a known position such as that of manipulator 504. However, other techniques can be used for assuring such precision.

It can also be appreciated that depending on factors such as component size, mating feature geometries and position and the limitations on a working knowledge of the position of manipulator 504 and associated motion control, successfully applying manipulator 504 to a face 503 of component 402E in a way that will assure interlock of the mating features can become difficult. Any of a number of techniques can be used to facilitate the positioning of manipulator 504 with respect to component 402E. For example, in at least one embodiment, a camera 507 or similar imaging device may be co-located with the central axis of manipulator 504. In such an embodiment, any suitable mark(s) (not shown) on or near recessed areas 501 of component 402E may be configured in a way to enable convenient identification of a center point or some other known point, such that aligning manipulator 504 along a vector normal to the center of the panel with a rotational orientation matching that of the panel would assure that the mating features would interlock as intended. Once component 402E is engaged and its position or orientation is altered as intended, the magnetic force sustaining adherence between manipulator 504 and component 402E can be broken either by halting the electric current powering an electromagnet holding the two bodies together or by applying an electric current to an electromagnet in an arrangement where such a magnet would negate the force of a permanent magnet that might be securing component 402E to manipulator 504.

Locally negating the natural attraction of magnets in a similar fashion is also a means by which a mobile agent can separate components 402 bound by magnetic forces.

One skilled in the art will recognize that the magnetic coupling described above is merely one example by which a mobile agent can manipulate components 402 such as component 402E. As described, state changes in semi-active components 402 such as component 402E can facilitate such manipulation. However such state changes are executed, the operable interlock between manipulator 504 and component 402E can be one that the mobile agent has the capacity to engage and manipulate.

In at least one embodiment, a mobile agent uses components 402 such as component 402E to build an assembly of components 402 that benefit from being mechanically joined to one another. A potential advantage to mechanical or other means of components 402 to attach to each other lies in improving the strength or stability of structures that the mobile agents might build, whether these are assemblies of similar components 402, such as a conventional wall, or dissimilar component types, such as a block latching to a steeple block mounted atop it.

In the described example, the mechanism may or may not rely on an external operator to provide the energy to change the state of the latching mechanism (e.g., unlocked or locked). In at least one embodiment, a semi-active component 402 (such as component 402E) may have its own internal power supply (not shown) to support its functional operation.

One skilled in the art will recognize that many other types of semi-active components 402 can be used. Other examples of semi-active components 402 may be those equipped with LEDs for illumination or status reporting, components 402 with integrated doorways or components 402 containing LCD displays, any of which may change state based on a potentially wide range of means such as a mechanical switch on the component's 402 surface changing position or the reception of a wireless signal providing the directive. Semi-active components 402 may also assume forms that may not resemble structural elements (blocks) per se and may not serve such a role as their primary function. Examples of semi-active components 402 of this sort include components 402 that facilitate or better enable mobile agents in executing their tasks. One example is a wheeled chassis mounted with a scissor lift capable of raising a platform from a low height off the floor to a higher elevation. Such a component 402, while likely differing substantially from a typical structural block form, can be designed to permit operation by a mobile agent 104 either to move it into a position at which an elevating platform would aid in building taller structures or raising and lowering said platform. In this fashion, semi-active components 402 of this nature may fulfill the functional role of tools (in this case, as a sort of construction equipment).

The example of the wheeled platform as a semi-active component 402 illustrates what might be common traits of this component type. One can appreciate that the component 402 might be designed for operation by a single mobile agent 104 or multiple mobile agents 104 acting in cooperation (e.g., one mobile agent 104 moving the wheeled platform to locations where passive components 402 are to be placed while another mobile agent 104 is positioned on the platform to place components 402 in the designated positions). Alternatively, the platform may also be equipped with hardware similar to that of a mobile agent to grip and manipulate components 402. In this fashion, the semi-active component 402 in this example serves to extend the manipulation and placement capability of a mobile agent 104.

Active Components 402

Active components 402 are primarily distinguished by their ability to act autonomously or otherwise perform functions without direct mechanical or electrical input or directive from a mobile agent 104. This category of components 402 presents the broadest types of functionality as well as the most versatility and autonomy. They may otherwise resemble semi-active components 402 in terms of functionality, but are able to act an appreciable degree of independence. These components 402 may contain, for example, sensors that trigger processes leading to action, and/or they may follow a programmed routine.

Any number of specialized components 402 may fit into this category. Some of these components 402 may have the same outward geometry as passive or semi-active components 402, permitting them to stack within structures built of passive and/or semi-active components 402, for example.

However, active components 402 may also serve an additional function beyond physical support. One example is a component 402 equipped with a sensor on its face to detect motion in its vicinity. Such a component 402 can be programmed, for example, to send a wireless signal to another active component 402 that contains a battery-powered motorized door. When the second component 402 receives the signal from the first, it actuates the door mechanism, permitting passage through the component 402.

In another example, an active component 402 may employ a timing scheme similar to a streetlight and control the flow of traffic by raising and lowering a drawbridge. Combining functional hardware, a means of communication and perhaps some degree of programmability (if the component 402 is not controlled directly by an independent host device), a broad array of possibilities exist for the roles of active components 402 in creating an interactive building environment. Active components 402 can thus be variously equipped with any suitable elements such as, for example, sound devices, digital display screens, lights and/or mechanisms that directly respond to and/or affect the activities of mobile agents 104 operating on working surface 407, and/or any combination thereof. In the same manner that the description of semi-active components 402 included tools or operable components 402 that did not serve a structural role, mobile agents 104 themselves, both functional and acting with a high degree of autonomy, may be considered a type of active component 402. For purposes of clarity, the following description involving mobile agents 104 will continue to refer to them as such, although such agents 104 can also be considered to be a type of active component 402 in the context described herein. Thus, in the example of FIG. 18, components 402 are likely passive and/or semi-active, but agents 104 can be considered a type of active component 402.

One particular type of active component 402 is a mobile agent 104 having some level of autonomous mobility. Mobile agents 104 can operate entirely autonomously, and/or they can be controlled by a user via some central control unit or individually. Alternatively, mobile agents 104 can operate as directed by autonomous control mechanisms in a central control unit. In at least one embodiment, mobile agents 104 and other active components 402 can function to attempt to achieve high-level goals that can be specified by a user or control unit, while functioning autonomously at a low level to achieve such goals.

Referring now to FIG. 1, there is shown a block diagram depicting a conceptual architecture of a mobile agent 104 according to one embodiment, including power, sensing, processing, and communication elements, as well as actuators and (optionally) output device(s). One skilled in the art will recognize that the various elements shown in FIG. 1 as being included in mobile agent 104 are merely exemplary, and that some of the elements may be optional. In addition, in alternative embodiments, other elements not shown in FIG. 1 can be included in mobile agent 104. In addition, different types of mobile agents 104 having different configurations of elements can be included.

Power element 102 provides power to mobile agent 104. Power may be provided from any suitable source, such as for example a battery, solar cell, and/or the like.

Sensing element(s) 103 (or sensors) can include any suitable element or combination of elements, such as for example optical, acceleration, gyroscopic, acoustic, encoding assemblies (e.g., magnetic wheel encoders), and/or pressure/force and distance sensors (e.g., infrared or ultrasonic based). According to various embodiments, sensors 103 may assist mobile agent 104 in a variety of functions such as determining and monitoring position (localization), identifying other components 402, manipulating components 402, and the like. Sensors 103 can be used in performing any activities involved in a mobile agent's 104 execution of its available tasks. In addition, in some embodiments, some sensors 103 may be directed toward monitoring an agent's 104 internal states such as wheel encoders providing information regarding rates of rotation or a specific rotational angle as it relates to position. Outward-directed sensors 103 can include sophisticated components such as 2D imagers as well as simpler ones such as ultrasonic distance sensors. In at least one embodiment, outward-directed sensors 103 can serve to monitor the state of a mobile agent's 104 surroundings and can detect changes within it, including information related to the agent's 104 manipulation or transport of other components 402.

Agent 104 can also include any suitable type of onboard processor(s) 105, such as, for example, a microcontroller and any associated memory modules, and/or any other suitable elements.

Agent 104 can also include any suitable type of communication module(s) 107, which can be implemented according to any known technologies and can rely on any suitable standards. Examples include any suitable wired and/or wireless technologies such as Bluetooth, Wi-Fi, and/or those using radio frequency or infrared light, and/or the like. Communication module(s) 107 can communicate via any available communications network.

Agent 104 can also include any suitable type of actuator(s) 106, which can operate to affect change directly (or indirectly) to aspects of the mobile agent 104 and/or its surroundings. Such changes can include, for example, moving or re-orienting agent 104, and/or interacting with components and/or other agents 104 (for example, to pick up and move blocks or other components). Actuators 106 can include elements that effect change in a mechanical sense, such as a propulsion mechanism, motors, voice coils, arms, and the like.

Agent 104 can also include output device(s) 107, although such devices are optional. Such output device(s) 107 can include any elements suited for providing output perceivable by users; examples include speakers, LEDs, and/or LCD displays. Output can be visual, auditory, haptic, and/or any combination thereof. In at least one embodiment, output device(s) 107 can generate output that can be signal other agents 104 (or give the appearance of signaling other agents 104) via their sensor(s) 103; for example, one agent 104 may respond to output generated by another agent 104. Such output generated by an agent 104 may or may not be perceivable by humans even if it is perceivable by other agents 104. Output device(s) 107, when included, may be considered a type of actuator 106.

Examples of output generated by device(s) 112 include notification to user that mobile agent 104 has a request requiring fulfillment; an indication of emotional response; feedback; detailed articulation of a request (either as an alternative to doing so through a dedicated user interface on a device or as a supplement to it); and/or the like.

In at least one embodiment, a mobile agent 104 may contain multiple copies of some or all elements identified in FIG. 1. Conversely, it is not necessary for a mobile agent 104 to contain all elements identified in FIG. 1. Because mobile agents 104 may assume a variety of forms, hardware configurations may vary according to an agent's 104 particular functional capabilities.

In at least one embodiment, mobile agents 104 recognize and maintain data regarding their location and orientation relative to the working environment. In at least one embodiment, the working surface 407 on which agents 104 operate provides a plane which may be enhanced to support agent localization. It is not necessary for the operating surface to be flat; rather, in at least one embodiment it may have curvatures, discontinuities, and/or other irregularities.

Localization

In at least one embodiment, mobile agents 104 have a working knowledge of their current position and orientation in space, so as to enable and support optimal execution of tasks involving motion or mobility, as well as to cooperate, compete, and otherwise interact with one another. Higher level processes such as path planning, object manipulation and coordination of effort among multiple agents 104 are implemented by providing persistent monitoring of the position and orientation or individual agents 104. Agents 104 can be made aware of locations of other agents 104, so as to facilitate various types of interaction among agents 104.

In at least one embodiment, the system maintains a virtual model of the positions of agents 104 within the environment. Such a virtual model can be stored centrally, and/or in distributed fashion, and can be made available to individual agents 104 so that they may be made aware of their relative positions with respect to other agents 104 and with respect to working surface 407, components 402, and/or other environmental elements. In at least one embodiment, the system and method maintain parity between actual physical locations of agents 104 within the physical environment and the corresponding locations of virtual representations of such agents 104 in the virtual environment. As described in related U.S. Utility application Ser. No. 13/963,638 for "Integration of a Robotic System with One or More Computing Devices", filed on Aug. 9, 2013, maintaining parity can include detecting physical and virtual locations, and adjusting one or the other accordingly. Priority can be given to the physical environment, in which case the virtual positions are adjusted based on detection of physical positions. Alternatively, priority can be given to the virtual environment, in which case agents 104 are instructed to move themselves and/or components 402 so as to comport with positions of corresponding elements in the virtual environment.

Maintaining parity between the virtual and physical environments can be beneficial for several reasons. In at least one embodiment, agents 104 plan actions and respond to events based on the virtual representation of the environment; therefore, differences between the physical environment and the virtual model of it can complicate successful execution of actions. Thus, maintaining parity can help agents 104 to more accurately perform their planned actions, by helping to detect inconsistencies and to remedy them.

In addition, unintended events or those external to a planned course of activity can disrupt one or more agents 104 engaged in a task. For example, if a structure of blocks collapses, whether by deliberate sabotage by a human onlooker or for some other reason, the system, in at least one embodiment, provides a mechanism by which agents 104 can recognize that the physical environment has diverged substantially from the virtual model of it. Agents 104 may further recognize that such divergence may preclude continuing with a current set of actions that were planned around a state of the virtual model that may be partly or completely irrelevant.

Accordingly, in at least one embodiment, the system maintains parity between the virtual and physical environments by obtaining information such as the location, position and/or orientation of agents 104 and components 402 as determined through available means of detection, comparing such information with the corresponding space in the virtual model, and adjusting the physical and/or virtual environments accordingly. In at least one embodiment, it is most desirable to minimize any differences that may emerge between the physical environment and the virtual representation of it, with respect to both the magnitude of any difference and the duration during which it exists. One can appreciate, however, that in other embodiments, particularly those in which elements of personality affect the operation of agents 104 as described herein, delays between the time at which parity is lost between the physical and virtual and the time at which an agent 104 adjusts its actions in response may provide reinforcement to the personality traits intended to be demonstrated by an agent 104 or to the overall impression of cognizance exhibited by an agent 104. For example, if an agent has a personality profile intended dispose its actions to resemble conventional notions of low awareness, a longer lag time can be introduced between the time at which an event that creates a substantial difference between the physical environment and virtual model occurs and the agent's 104 response to such an event. In this regard, while processes that seek to maintain parity between the physical and virtual may detect a difference, algorithms related to presenting an agent 104 with elements of personality may artificially delay an agent in its identification of the difference and its response to it. As discussed herein, such lag time can also provide a source of entertainment to human observers.

Unplanned events that result in divergence between the physical environment and the virtual representation, such as the aforementioned example of a physical structure's collapse, can also serve as triggers for one or more actions associated with an emotional response that might be part of an agent's 104 personality profile. For example, as a setback to building progress, a structure falling apart would likely be a demoralizing or frustrating event for a human participant in a construction undertaking. Accordingly, in the context of the present system, an agent 104 might project indicators of frustration such as, for example, an agent 104 driving in circles at high speed or a change in appearance of a display that conveys anthropomorphic properties (e.g., an LCD display normally depicting images intended to represent eyes and eyebrows animating the images to suggest squinting, downturned brows and eye color turning red, audible noises or a voice expressing anger, and/or the like). In general, the system can use cues of physical or digital animation that can draw upon a broad social vernacular of body language to convey emotional responses to events.

Once a divergence is detected, in at least some embodiments, in order to maintain parity between the physical environment and the virtual representation of it, the system can enlist agents 104 to survey the extent and nature of the divergence. In the case of collapse of a structure having many components 402 (such as blocks), one can appreciate that the process of restoring parity between the physical and the virtual can take some time and might involve a number of agents 104 navigating around scattered components 402 to provide data regarding their new positions and locations. In such instances, the system can cause such a survey of the landscape to be completed prior to formulating a response, particularly if the processes guiding an agent's 104 actions would dictate attempting to rebuild the structure. In some cases, the survey of the environment following a divergence such as an uncontrolled collapse of a structure might yield an incomplete mapping of all components 402, either because some components 402 are obscured by others from all means and positions of observation available to agents 104 or because the components 402 are no longer in the formal environment (e.g., the agents 104 were operating on a table and one or more components 402 have fallen to the floor below). The uncertainty introduced in such a situation can factor into the actions formulated for the agents 104, particularly, as in the example of an inability to account for all components 402 previously present in a structure, with respect to restoring the configuration of components in physical space prior to the divergence. Some embodiments might also include agents 104 engaging in a survey process that includes sorting and organizing components 402 in order to clear an area for rebuilding and/or to assess what components 402 had been involved in the collapse and, among these, what components 402 were no longer accounted for (e.g., if they had tumbled outside the areas accessible to agents). Completing this, agents 104 can then determine a course of action, whether rebuilding using components 402 and supplementing for those missing with others available elsewhere as needed, notifying a user that further direction is required, or performing some other action in response.

Localization can be performed using any suitable means. In at least one embodiment, an active method is used, such as by emitting signals and determining location based on the reception of signal reflection. These include ultrasonic-based or light-based measuring techniques. This type of approach may be enhanced by elements deliberately placed in the range of the working environment such as reflectors or beacons that may be triggered to respond according to the emitted signal. More passive methods also exist, including those based upon acquiring images from a camera or other optically-based means of gathering data regarding the physical (spatial) environment. Passive processes may also make use of markers or other elements intended to structure an environment for easier localization by systems developed to recognize such markers. For non-optical passive systems such as those relying on magnetic field detection, some distribution of markers within range of the space available for agent operation may be used for localization.

In at least one embodiment, working surface 407 (or mat) on which mobile agents 104 operate may provide localization information by virtue of readable codes (e.g. optical, RFID, and/or magnetic codes) present on surface 407. In at least one embodiment, an agent 104 can optically detect and decode marks on surface 407 so as to make determinations regarding the agent's 104 environment and its location within that environment, as described in related U.S. Utility application Ser. No. 12/788,605 for "Distributed System of Autonomously Controlled Toy Vehicles", filed on May 27, 2010 and issued on Jan. 15, 2013 as U.S. Pat. No. 8,353,737. In other embodiments, however, working surface 407 may be omitted and/or may not provide localization information; rather, mobile agents 104 may use other mechanisms for localizing themselves, including for example triangulation with objects or signals in the environment, optical detection of other agents 104 and/or reference features, and/or the like, or any combination thereof.

Any of a number of approaches can be used to structure an environment with information or points of reference that facilitate determination of position or orientation based on local observation and/or reading of codes. For example, in at least one embodiment, mobile agents 104 employ an optical system of observation in which a camera on agent 104 collects images of a portion of working surface 407 containing an optical code. The optical code can include any suitable pattern or similar structured mark. Other systems involving non-optical codes (such as RFID and/or magnetic codes) can also be used.

Figure 16:
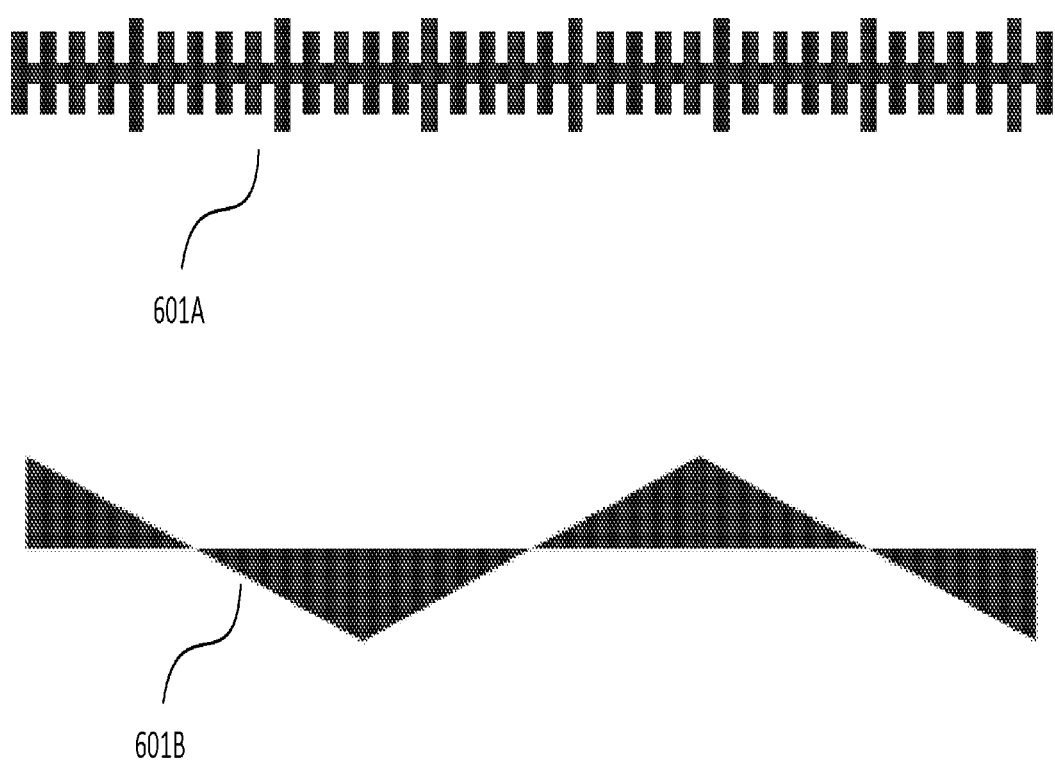
FIG. 16 depicts examples of variable code lines, according to various embodiments.

For example, as described in the above-referenced related U.S. Pat. No. 8,353,737, working surface 407 can include an optically readable encoding scheme that is co-linear with a preferred path or paths of travel. In this manner, the codes can provide information regarding location along a track segment for mobile agents 104. Such a method thus provides a means of localization to one of many particular reference points and lends itself to deducing a relative position between such points by taking advantage of the regularity in code structure. Referring now to FIG. 16, there are shown examples of codes 601A, 601B that are arranged according to such a structure.

In at least one embodiment, as shown in the examples of FIG. 16, a meter line is included, consisting of a line of repeating tick marks or similar indicators spaced closely and located co-linear with the preferred path or paths of travel. Using a meter line as a reference in this manner, the precision at which relative positioning can be calculated based on any absolute position established by a code's reference point can be defined by the frequency of the meter line's constituting tick marks or dashes along a given length. Other approaches may incorporate metering directly into a line provided as a guidance path. For example, in codes 601 that form a grid such as the hexagonal grid of FIGS. 6 and 14, tick marks or some other indicator(s) can be included in borders between cells of the grid.

As shown in the example code 601A of FIG. 16, in at least one embodiment, rather than using a line of uniform width, the system uses a line whose width alternates in regular steps between a thicker section and a narrower one. While the path remains continuous, the regular interval for step changes in width yields an appearance similar to a symmetrical square wave; this can be useful for monitoring travel distances between other positional information marks.

In yet another embodiment, as shown in example code 601B, a travel path's width may change linearly at regular intervals such that it expands and contracts in an appearance more consistent with a sawtooth form. Such an approach facilitates determination of relative position between the expansion and contraction points along the path according to the width of the line at any particular point relative to the maximum and minimum widths.

In at least one embodiment, a scheme of encoding localization is adopted, wherein mobile agents 104 may have preferred paths of travel within the working environment (for example, along a track segment as described above and/or in the above-referenced related patent). It may be advantageous, however, for an encoding scheme to support localization without association to a particular path or paths of travel. For example, the encoding of reference information can support recognition from possible orientations of observation away from the surface. This can be accomplished, for example, by analyzing data gathered during observation such that if there is a preferred or even a necessary orientation for observation of a mark or marks to enable successful recognition, observation data can be adjusted to find the correct orientation. An example of such a scenario might involve images collected of a pattern or a portion of a pattern containing encoded information on the working surface. If the pattern has a preferred orientation for analysis, processing can adjust an image of the surface to find the preferred orientation. In this example, the marks may enable determination of position. The processes that correct for observational orientation away from the mark's preferred orientation can also provide the orientation of agent 104 relative to the working surface.

Figure 6:
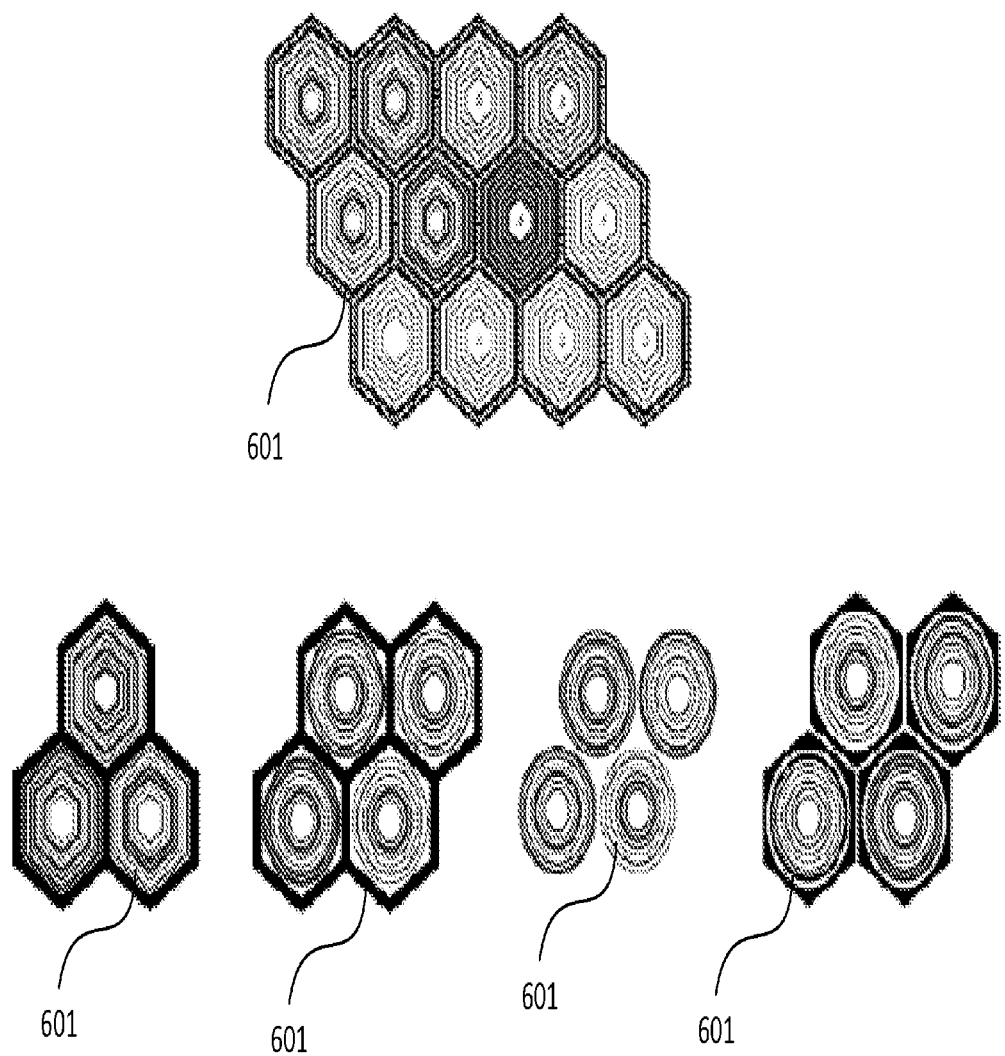
FIG. 6 depicts examples of machine-readable codes that are presented as marks designed to be read from multiple orientations, according to various embodiments.

In at least one embodiment, codes are presented as marks designed to be read from multiple orientations. Referring now to FIG. 6, there are shown examples of such machine-readable codes 601 that can be read from multiple orientations. Codes 601 can be used, for example, in connection with any of the arrangements and methodologies described above, and can be used, for example, across working surface 407 to support localization of an agent 104 operating on surface 407, according to one embodiment.

Figure 15:
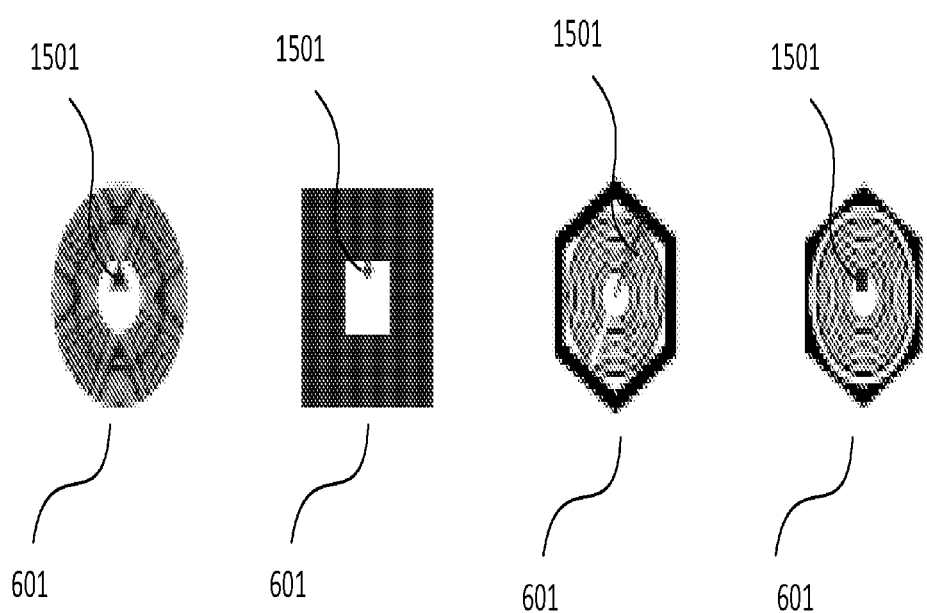
FIG. 15 depicts examples of machine-readable codes including orientation indicators, according to various embodiments.

As shown in FIG. 6, in at least one embodiment, data is encoded in concentric hexagons and circles of varying line thicknesses, effectively constituting a series of radial bar codes. However, one skilled in the art will recognize that any other types of machine-readable codes 601 can be used, and that such codes 601 can take any suitable form and appearance; they may or may not be visible to the human eye. In at least one embodiment, the encoded data can contain local position information (e.g., ordinal distances to a reference origin). However, because codes 601 are intended to support reading from multiple directions, deducing an observer's orientation relative to codes 601 can become more difficult. As a remedy to this, supplementary marking can enhance codes 601 by indicating an orientation. An example of a convenient approach to providing this improvement is to reserve the center of a concentrically organized mark for indicating orientation with an arrow or a dot indicating a reference orientation or a preferred cardinal direction. The indicator may or may not use the familiar convention of a magnetic compass's layout, however, as it can assume any form that establishes a reference orientation. Referring now to FIG. 15, there are shown examples of machine-readable codes 601 that include orientation indicators 1501 of various types. One skilled in the art will recognize, however, that orientation indicators can take any desired appearance or form.

In another embodiment, information can be encoded in machine-readable codes that have a preferred orientation, such as Quick Response (QR) codes or the like. A benefit to using a marking scheme based on QR codes (or the like) is that the geometry is both well disposed to arranging in a grid pattern and the scheme is suitable to encoding a relatively large amount of information in a compact space. QR codes contain reference marks that indicate a preferred orientation as well as scale. In at least one embodiment, the system provides a working surface 407 containing a grid of marks in the form of QR codes (or the like). As with the radial or hexagonal codes 601 described previously in connection with FIG. 6, the QR codes can contain a variety of information such as unique identification codes, material IDs, and/or the like. Neighboring codes on a surface can provide differing information.

Figure 20:
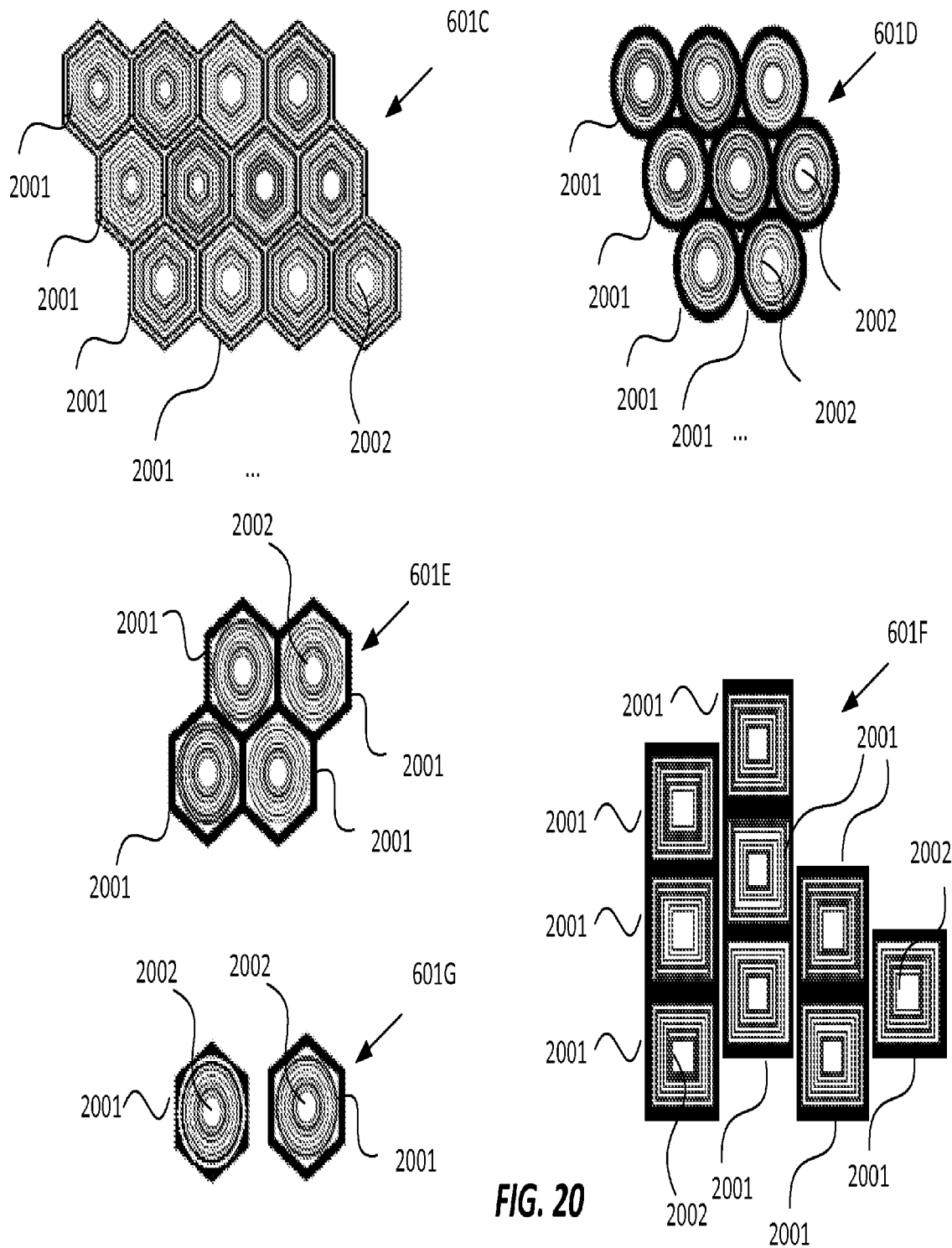
FIG. 20 depicts additional examples of code types, according to various embodiments.

Referring now to FIG. 20, there are shown additional examples of code types, according to various embodiments, each using a concentric code scheme. In each example of codes 601C, 601D, 601E, 601F, 601G, data is encoded in the sequence of line weights radially ordered from the center of each cell 2001. In at least one embodiment, the empty space 2002 in the center of each cell 2001 may be filled with a marker or other identifier, for example to indicate a specific spatial reference, a reference to an ordinal direction, and/or an area designation (such as to indicate one building area versus another). In some of these examples, a meter line bounding each cell 2001 provides reference for localization in transitions across cells 2001. Alternatively, as shown in code 601E, cells 2001 can be spaced apart from one another to establish borders.

In at least one embodiment, line weights can indicate the value of a specific code element (such as a cell 2001), so that a sequence of closed lines radially arranged around a cell's center can be read according the line weights of each radial to yield the encoded information. In at least one embodiment, cells 2001 are of constant size and arranged in a regular formation, so as to provide an ability to deduce information about relative position and, in instances in which the encoded information contains spatial location and/or the cell 2001 contains a reference point either marked within the cell 2001 as a graphic element or as readable data, global position can be determined from relative position away from a point of known spatial location.

In some contexts, it may be useful to provide different types of encoded data on a particular surface 407. For example, in embodiments in which multiple working surfaces 407 might be in use simultaneously, each surface 407 can include interspersed codes 601 that uniquely identify the particular surface 407. Alternatively, any of the codes 601 described herein can also include information identifying the particular surface 407 in use. Such a technique can help avoid potential uncertainties introduced by using multiple surfaces 407 that might otherwise be confused with one another.

Figure 19:
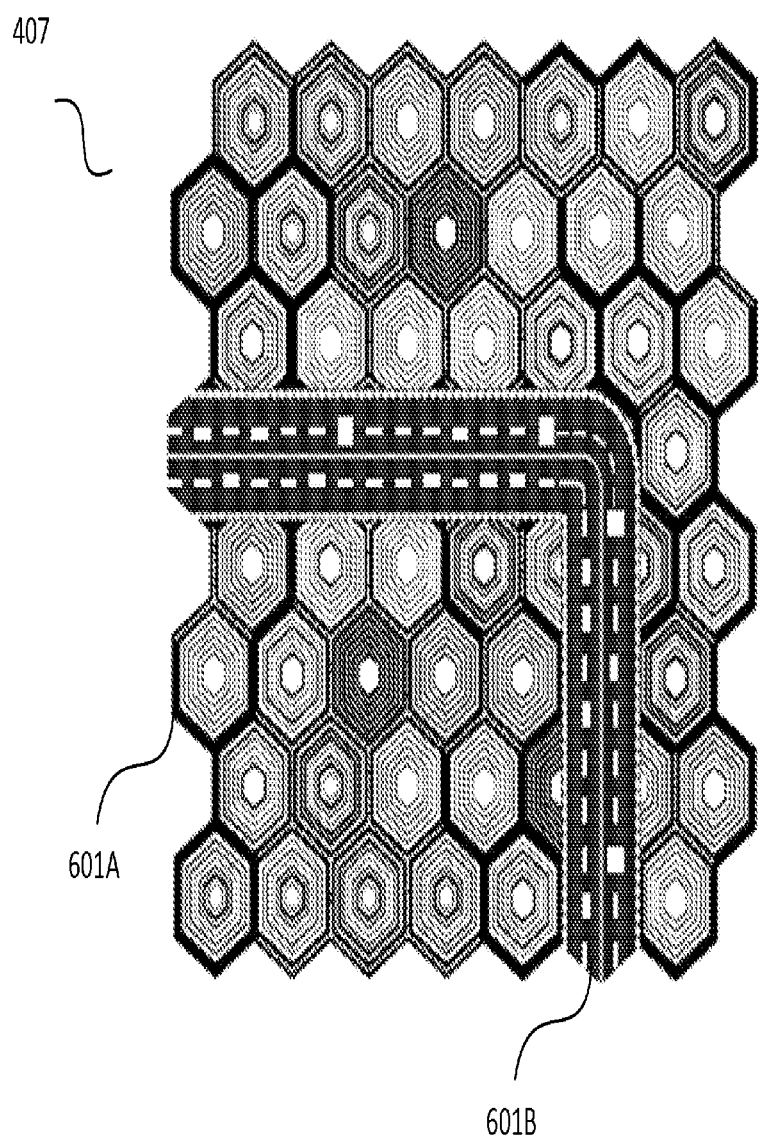
FIG. 19 depicts an example of a working surface having mixed code types, according to one embodiment.

Referring now to FIG. 19, there is shown an example of a working surface 407 having a mixed use of code types. Hexagonal codes 601A facilitate reading from multiple directions; closely spaced code lines facilitate precision in localization in areas of surface 407 designated for building. Such codes 601A are therefore well-suited for generalized placement of components 402 such as blocks.

Code 601B is located in an area of surface 407 designated for transit, and is therefore disposed toward straight line travel at a higher speed than the slower motion typically used for component 402 manipulation and placement. Accordingly, markings within code 601B are longer and are spaced further apart. In at least one embodiment, as shown in the example of FIG. 19, code 601B includes white square-tooth meter bars bounding each side, to assist in recognizing the transition from one code zone to another. In some cases, some uncertainty may exist in the time between an agent 104 leaving a known position in one code base to establishing a new reference position in the other code base.

With respect to localization, a portion of the data can be at ordinal distances from the code's geometric center or some other point within the code to a reference origin for the working space (such as, in the case of a mat or other working surface 407, a particular corner). Additional information may include the dimensions of the code itself; alternatively, code dimensions can be specified and known in advance by agent 104 or its governing control system; for example, agent 104 can reference look-up information that permits localization to any point within the outline of the code when coupled with the ordinal distances of the code's reference point. While QR codes have a preferred orientation, in at least one embodiment, the codes can be read at any orientation, and references points within the codes can allow agent 104 to determine preferred orientation; from this, the relative orientation of observation with respect to the code (and thereby working surface 407) can be determined.

In either the case of using a radially designed encoding scheme or an encoding method with a preferred orientation such as QR codes, it is not necessary to maintain uniformity of size among the code marks. In at least one embodiment, some portions of working surface 407 may have areas in which precise movements of the mobile agents may be more important than in other areas. An example might include portions of working surface 407 intended to be dedicated as a transportation route and therefore kept clear of structures might have less need for localization to very tight precision, but instead might favor speedy navigation through such areas. In this case, larger codes that might be more conducive to reference while traveling at a faster speed can be the better choice for these areas while in zones of working surface 407 that are intended to support structures erected by mobile agents 104 might benefit from a smaller size of codes to better enable the agents to control their positioning and component 402 placement to smaller tolerances.

In at least one embodiment, the entire code need not be captured in order to decode the data. This may be particularly applicable when a radial coding technique is used. One of the advantages of such a scheme is that the omnidirectional presentation of data from a center point permits reading the complete encoded data from visibility of a single radial vector. Accordingly, radial coding can afford a greater likelihood of fully reading the encoded data when only a portion of a code 601 is visible or is captured, as opposed to an encoding scheme in which requires full capture of a code 601 image for interpretation.

The localization methods discussed thus far provide techniques for encoding locational data within a code consisting of a pattern of marks. In other embodiments, however, other methods are used for a mobile agent 104 to deduce position and orientation from the interpretation of one or more codes on a working surface 407. In one embodiment that does not rely on decoding data stored in local codes, the layout of the entire pattern of marks on working surface 407 may be known in advance, such that determination of location is based upon matching the codes captured in local observation to corresponding location(s) within the larger pattern. In this scenario, the approach is analogous to finding a location on a map based on identifying a subset of local features within a larger spatial feature set.

For example, a pattern of marks covering working surface 407 or those parts of surface 407 that are intended for agent operation might consist of pixels in a non-repeating pattern such that local observation of the pattern does not yield multiple potential locations. In such an embodiment, a minimum number of pixels is captured within an observation to permit matching of the local features within the larger set constituting the entire pattern. In matching the local features, it is possible that the orientation of observation yields a local pattern that requires some manner of re-orientation to match the orientation of the global reference pattern as stored as part of the localization process. A transformation can be applied to reorient the pattern; such transformation also yields information regarding the orientation of observation with respect to working surface 407.

System Architecture

In at least one embodiment, the system is implemented using various components that can communicate with one another using any suitable means. In at least one embodiment, the system can be implemented using a set of mobile agents 104 in which control is divided between the agents 104 and a wirelessly connected central device or split further among mobile agent 104, a central device that actively maintains parity between the physical state of the operating environment and a virtual one, and a device dedicated to providing a user with direct control of mobile agent's 104 motion and actions, as described in related U.S. Utility application Ser. No. 13/963,638 for "Integration of a Robotic System with One or More Computing Devices", filed on Aug. 9, 2013.

Figure 13:
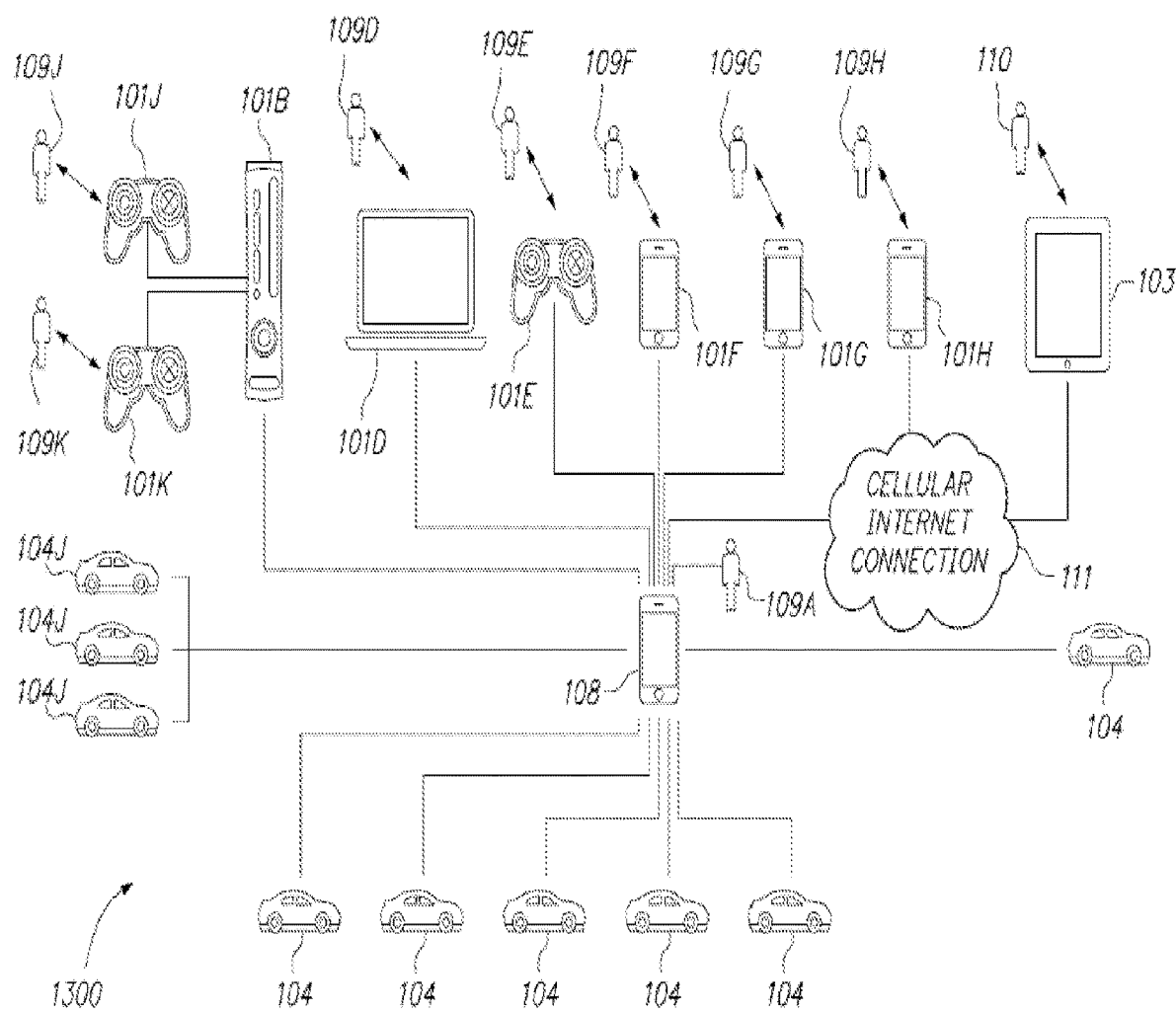
FIG. 13 is a block diagram depicting an implementation architecture according to one embodiment.

Referring now to FIG. 13, there is shown an implementation architecture according to one embodiment. As depicted in FIG. 13, in at least one embodiment, the system 1300 is hosted by a host device 108, which may be implemented on any suitable computing device, whether mobile or stationary, such as for example a smartphone, tablet, laptop computer, or the like, and/or any combination thereof. In at least one embodiment, host device 108 supports and runs various algorithms contained in software which implement operations of the overall system. Host device 108 and associated software are collectively referred to herein as a base station or central control unit. Although FIG. 13 depicts all communication passing through host device 108, in alternative embodiments, agents 104 can communicate directly with one another, and host device 108 can even be omitted altogether.

Any of a variety of different devices can serve as host device 108; examples include smartphones, tablet computers, laptop computers, desktop computers, video game consoles, and/or any other computing device capable of supporting the control software for the system. In at least one embodiment, such a device can use any suitable operating system, including for example and without limitation: iOS or MacOS, available from Apple Inc. of Cupertino, Calif.; Android, available from Google, Inc. of Mountain View, Calif.; or Windows, available from Microsoft Corporation of Redmond, Wash. In at least one embodiment, host device 108 is an iPhone or iPad, available from Apple Inc. of Cupertino, Calif., running a suitable software application ("app"). In at least one embodiment, software for controlling host device 108 may be provided via any suitable means, such as a downloadable application ("app") that includes the appropriate functionality and gameplay structure to operate agents 104 in physical space and to plan, coordinate and execute interactions among agents 104 including gameplay, construction, cooperation, conflict, and/or the like; these interactions can take place according to rules, and under the direction of user input, artificial intelligence, or a combination thereof. In at least one embodiment, host device 108 maintains the state of agents 104, and sends and receives commands to and from agents 104. Host device 108 may also include a suitable user interface for facilitating user interaction with the system.

For purposes of the description provided herein, agents 104 are referred to as mobile agents 104, although some or all of such agents 104 may be stationary. As described above, agents 104 can be a type of component 402 within an architectural framework that includes other components and elements, including passive, semi-active, and active. In at least one embodiment, agents 104 are vehicles such as toy construction vehicles, although they may be other objects or components.

In at least one embodiment, host device 108 is the central node for all activity and control commands sent to agents 104, whether the commands originate from algorithms running on host device 108 or are routed through host device 108 but originate from control devices 101D through 101K controlled by users 109D through 109K who are physically present or remotely located. In other embodiments, a more distributed architecture may be implemented wherein host device 108 need not be the central node for all activity and control commands.

The example shown in FIG. 13 includes a specific number of controllers 101D through 101K, agents 104, and AI-controlled agents 104J. One skilled in the art will recognize that the particular quantities of the elements depicted in FIG. 13 and described herein are merely exemplary, and that the system can be implemented using any other quantities, and/or with some of the elements being omitted if appropriate. In addition, agents 104 are depicted in FIG. 13 as vehicles, although they can assume any suitable shape.

In the architecture of FIG. 13, system 1300 is implemented in a centralized manner, wherein controllers 101D through 101K and agents 104, along with other elements, communicate with host device 108. As depicted, in at least one embodiment, multiple users 109 (or players) can control multiple agents 104, while other agents 104J may be controlled by means of artificial intelligence.

As shown in FIG. 13, any number of external devices may be connected to host device 108 via any suitable communications protocol, such as for example a cellular/Internet connection 111. The various external devices may or may not be identical to host device 108. Some or all of the external devices serve as controllers. FIG. 13 depicts various examples of devices that can be used as controllers, including: game console 101B with any number of controllers 101J, 101K (controlled by users 109J, 109K, respectively): laptop computer 101D (controlled by user 109D); stand-alone controller 101E (controlled by user 109E); and smartphones 101F, 101G, and 101H (controlled by users 109F, 109G, and 109H, respectively). In at least one embodiment, any or all of controllers 101 can be an iPhone or iPad, available from Apple Inc. of Cupertino, Calif., running a suitable software application ("app"). Controllers 101J, 101K, 101E can be of any suitable type, including for example controllers that are commonly used with console game devices.

In at least one embodiment, a game or play environment is hosted on host device 108. Host device 108 supports gameplay and/or other manipulation of agents 101, components 402, and/or other elements in physical space in a physical environment (such as on surface 407) as well as in a virtual environment under the direction of software; the state of the virtual environment is maintained in memory on host device 108 and/or elsewhere.

As described in related U.S. Utility application Ser. No. 13/963,638 for "Integration of a Robotic System with One or More Computing Devices", filed on Aug. 9, 2013, in at least one embodiment, base station software, running on host device 108, maintains a virtual model of the environment, including positions of agents 104 and components 402, and can perform operations to reconcile such virtual model with detected locations of agents 104 and components 402 in physical space. In this way, host device 108 continuously maintains parity with events in the physical environment by updating stored information relating to position, direction, velocity and other aspects of agents 104 and/or components 402. In at least one embodiment, host device 108 ensures that at any point in time the states of the physical environment and the virtual environment are identical (or substantially identical), or at least that the state of the virtual environment is a representation of the physical state to at least a sufficient degree of accuracy for gameplay purposes. In at least one embodiment, the system allows for bi-directional influence between the states, such that events occurring in virtual space can influence the physical state and vice-versa. Priority can be given to either the virtual or physical state, as described herein and in the related patent application.

In at least one embodiment, artificial intelligence software runs on host device 108 and issues commands (via wireless communication mechanisms or other mechanisms) to control one or more agents 104J. In other embodiments, software for controlling agents 104J may be located elsewhere, and/or may run on agents 104J themselves.

In at least one embodiment, host device 108 can simultaneously serve as a control unit for a human user 109A controlling an agent 104. Such functionality can be provided on host device 108 while host device 108 also serves as a conduit and interpreter for control commands incoming from other devices 101D through 101K controlling other vehicles 104. In another embodiment, host device 108 does not serve as a control unit for a human user 109, but rather operates as a dedicated central control unit.

Player controllers 101D through 101K may communicate directly with host device 108 or they may communicate via intermediary devices. For example, in FIG. 1, controllers 101J and 101K communicate with host device 108 via game console 101B. Similarly, any number of tiers of connections can be configured between player controllers 101D through 101K and host device 108, such as one or more smartphones connecting to host device 108 through a succession of devices networked back to host device 108.

It can be appreciated by one skilled in the art that as the number of users 109 and the number of AI-controlled opponents increases, the performance demands on host device 108 likewise increases. Depending on the number of agents 104 and the capacity of host device 108, the increases in computational requirements, for example, can impact performance. In at least one embodiment, the system is implemented in a distributed environment, wherein, for example, host device 108 has the capacity to distribute portions of its logic to any number of devices to which it is connected and which are capable of supporting execution of said logic. Examples of these include smartphones, tablet computers, laptops, game consoles, and/or the like, but can also be any suitable devices capable of providing the necessary support to run the logic assigned to it. In at least one embodiment, for example, some of the processing tasks associated with operating system 1300 can be distributed to one or more controllers 101D through 101H.

It is not necessary that the distribution remain local; in at least one embodiment; logic can be distributed to, for instance, one or more remotely located servers (not shown). A modular design to the structure of host device 108 can lend itself to convenient distribution of logic, and the type of logic processes offloaded from host device 108 need not be of one particular type of function or process. In at least one embodiment, for example, the distribution of logic can be prioritized according to computational and memory demand, such that those most taxing of host device's 108 resources are the first to be allocated elsewhere.

It is not necessary that the wireless interface employed to communicate with and/or among controllers 101D through 101H be identical to that used to connect to agents 104 under the users' 109 control. For example, it is possible that host device 108 communicates with controllers 101D through 101H via Wi-Fi, while host device 108 communicates with agents 104 via Bluetooth. In such a case, host device 108 can serve as a bridge between a high-power protocol (such as Wi-Fi) and a low-power protocol (such as Bluetooth). The advantage of such an approach can be appreciated in instances in which agents 104 controlled by users 109 via host device 108 or controlled directly by host device 108 (in the case of agents 104J under AI control) have limited power budgets.

As described above, controllers 101D through 101H can be implemented using any suitable devices. Again, less sophisticated controllers 101J, 101K can be used, such as wireless gamepads or joysticks. In instances in which a gamepad or joystick 101J, 101K is used which is not equipped with a wireless communication module supporting direct communication with host device 108, the connection to host device 108 can be achieved through a game console 101B or other intermediary, or through the use of a dongle (not shown) that plugs into an appropriate port on host device 108. Such a dongle links wirelessly to controller 101 and passes communications through the port into which it is plugged. Alternative embodiments of the dongle can include units that implement a bridge between a wireless protocol compatible with controller 101 and a wireless protocol compatible with host device 108.

In addition to passing users' 109 commands through host device 108 to vehicles 104B through 104F, controllers 101D through 101H can also receive updates from host device 108 that reflect the current state of the game. In at least one embodiment, some or all controllers 101D through 101H can be equipped with one or more output devices (such as a display, speaker, haptic output mechanisms, and/or the like), so as to be able to enhance the play experience based on such received state information. Such enhancements can include, for example, renderings, haptic output (e.g., vibration) and/or or audio representing action on the game track and/or augmenting such action to increase the sense of realism or provide details otherwise not visible to a user 109.

In at least one embodiment, the visual, haptic, and/or audio information presented to users 109 through some or all controllers 101D through 101H can be unique to each device. Various agents 104 may be in different states at any given time (with respect to, for example, position, speed, status, action, and the like); in addition, in the case of multiple users 109 controlling a single agent 104, user roles or control may be different. Therefore, the various cues and data presented to each user 109 can be tailored to the current state of the agent 104 and the user's 109 particular role.

In various embodiments, users of controllers 101D through 101H may be physically present, so that controllers 101D through 101H communicate directly (via wireless protocol such as Bluetooth) with host device 108. Alternatively, users of controllers 101D through 101H may be remotely located and connected via a host network (such as network 111). Controllers 101D through 101H may rely on information reported back from host device 108 regarding game status.

As mentioned above, in at least one embodiment, multiple users 109 can control a single agent 104 in a game. For example, three users 109 might control a single agent 104 in which one user 109 is providing directional and speed control, another user 109 can control arms or a forklift on agent 104, and a third user 109 can control an auxiliary manipulating element. In such a scenario, controllers 101 provide information tailored to the role filled by each user 109.

In at least one embodiment, the system is implemented using an architecture that provides division of control such that high-level functions, such as overall construction task assignment, are assumed by a control device external to mobile agents 104, and low-level commands, such as manipulation of individual components 402, are managed onboard each mobile agent 104. Such an architecture can be implemented, for example, using the techniques described in the above-cited related applications. In other embodiments, any other suitable architecture can be used, including for example those that do not necessarily rely on offloading more computationally intensive processes to peer devices.

In at least one embodiment, even if mobile agents 104 do not need to rely on peer devices for processing or other high- or low-level functionality, such a device can still be provided for allowing a user to provide instruction to one or more mobile agents 104.

Component 402 Recognition

In at least one embodiment, components 402 of differing types can be in use simultaneously on working surface 407; these components 402 may include mobile agents 104 and/or other components 402. Indeed, the working surface 407 may itself be considered a type of passive component 402. As noted, components 402 can be categorized as passive, semi-active or active, and, as described, components 402 may differ in size, shape, mass and/or other aspects of their physical properties. In order for the system to function optimally, in at least one embodiment the system controlling mobile agents 104 recognizes components 402 and determines each individual component's 402 type.

Components 402 may also have other attributes which distinguish them in terms of particular function; such differences may or may not be apparent on visual inspection. In at least one embodiment, mobile agents 104 operating on the working surface have the capacity to identify components 402 (including other mobile agents 104) accurately and reliably as well as determine the position and orientation of components 402 on working surface 407 and/or with respect to some reference point, in order to successfully and reliably move and manipulate components 402.

Any of a number of methods can be used for component type recognition and component 402 position/orientation recognition. In at least one embodiment, an optically-based approach can be used, employing at least one of: 1) machine-readable codes, 2) pure image processing and 3) structured light. These methods can be used singly or in any suitable combination with one another.

For example, a structured light approach can be used, either alone or as a supplement to one or both of the other methods. A structured light scanner can be included in one or more agents 104. One example of the application of structured light involves projection of a known pattern of pixels, such as a grid, on a scene, and observing the manner in which the known pattern deforms when striking surfaces. Thus, structured light yields a geometric discretization of space. Since structured light may omit information regarding color or texture, differences in components 402 that are detectable based on color may not be easily distinguishable by structured light methods. Additionally, distinctions based on differences in surface features that are modest relative to the resolution of a structured light scheme may also be difficult to detect. Thus, in at least one embodiment, it may be useful to supplement structured light with one or more supplemental recognition methods.

In an embodiment using machine-readable codes, certain aspects of the methods previously described to facilitate localization on working surface 407 may lend themselves in a similar fashion to component 402 recognition. Specifically, the use of geometric patterns and/or encoded data such as QR codes can assist in recognizing component type, face 503, and/or orientation. In at least one embodiment, the use of a 2D encoding scheme such as a QR code (to mark the face 503 of a component 402 can imply a preferred component 402 orientation in any observation of the machine-readable code. Additional information that can be helpful in identifying important component 402 characteristics such as component type, component 402 dimensions or specific face 503 of a component 402 (on which the mark is applied) can be encoded within the machine-readable code.

In at least one embodiment, an encoding scheme is provided for facilitating a mobile agent's 104 recognition of a component 402; this scheme can, for example, organize the encoded data into an appropriate structure such as an ordered sequence. An example of such a sequence is a three digit code in which the first two digits identify the component type and the last digit indicates the specific face 503 of the component 402 (e.g., a component 402 in the shape of a cube would have six possible specific faces: north, east, south, west, top and bottom). Such an approach allows mobile agents 104 to have information available regarding the component 402 geometries that correspond to a particular component type ID code. Such information may be stored in memory on mobile agent 104 or may be downloaded or accessed as needed. One skilled in the art will recognize that such an encoding scheme is merely exemplary, and that other schemes can be used.

In another embodiment, image data and/or an ID code are passed to another device for processing. Such an approach can be used, for example, in embodiments in which mobile agents 104 are centrally controlled or monitored by a single device such as host device 108. Image data and/or an ID code can thus be processed at host device 108, with the interpreted results being transmitted to mobile agent 104, or with instructions based on such results transmitted to mobile agent 104.

In yet another embodiment, component 402 information can be incorporated into the encoded data itself, such as the orthogonal dimensions of the component's 402 face 503 or data indicating component 402 shape and subsequent information capturing face dimensions or other defining characteristics. One skilled in the art will recognize that, in some situations, the described ID encoding scheme may not be as well disposed to characterize components 402 with geometries that are more complex than or diverge from a conventional cube form (e.g., components 402 with geometries composed of faces of size or proportion insufficient to displace codes as discussed thus far at a useful size). In such cases, alternative encoding formats might be considered to better suit a broader array of forms while still retaining the basic approach of providing size, type, and orientation data in a coded mark on a component's 402 face 503.

Just as the appearance of a machine-readable code (also referred to as a "mark") that provides reference to a preferred orientation can be used to determine the relative rotational orientation of the marked surface normal to the observer, the manner in which the observed machine-readable code's shape diverges in appearance from its appearance when viewed normal to its surface provides information about the relative position and orientation of the component 402 in space with respect to a point of observation. Specifically, in situations where a graphical data encoding scheme is employed that adheres to a standard geometric format, deviations in the observed machine-readable code from the standard format can be used to determine position and orientation of the component 402 in relation to a camera or scanner on agent 104.

For example, for a QR code, the assumed form is square. When such a code is viewed outside a vector normal to the center of the code, the viewing perspective distorts the shape in predictable ways. Based on an understanding of how geometries are transformed by perspective, the system can deduce relative position and orientation of the face bearing the code with respect to the observer. Thus, in at least one embodiment, the system processes the observed appearance of the code to yield relative distance and orientation, using knowledge of the code's normal appearance and size, both of which can be made available either through advance knowledge, or by reading the code, or by some combination of both.

In some cases, image resolution, observational distance, and/or other factors may limit the system's accuracy in resolving the relative position and orientation of a coded face. Consequently, in at least one embodiment, other methods are used to supplement the information provided through analysis of the coded mark's appearance. For example, additional marks may be provided on a component 402 in one or more locations. For component forms with flat surfaces, corner points may be marked so as to establish references that coincide with readily identifiable points on a component's 402 geometry. For example, for a component 402 that is a cube-shaped block, reference marks may be placed at the eight corners of the cube, with four marks being located adjacent to any particular face of the cube-shaped block. In instances in which a component's 402 face 503 is larger than the code mark located on it, reference marks located at the limits of faces (i.e., the corners) provide an improved perspective that can help to identify a particular face's position and orientation relative to a point of observation.

In various embodiments, such reference marks can assume any of a number of forms. In at least one embodiment, a scheme is adopted that serves to improve the reliability of recognition of both the mark and its relationship to the component's 402 face 503.

Figure 7A:
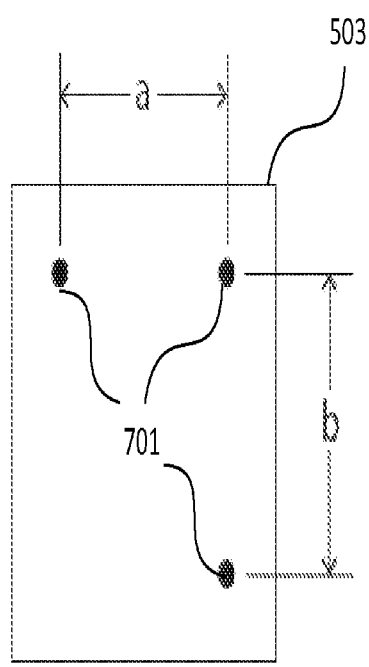
FIGS. 7A through 7C depict examples of reference marks as they may appear on a face of a cube-shaped component such as a block, according to various embodiments.
Figure 7B:
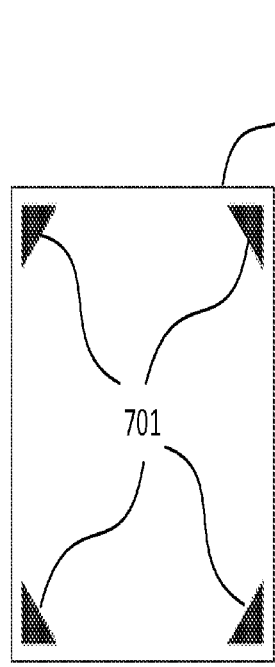
Figure 7C:
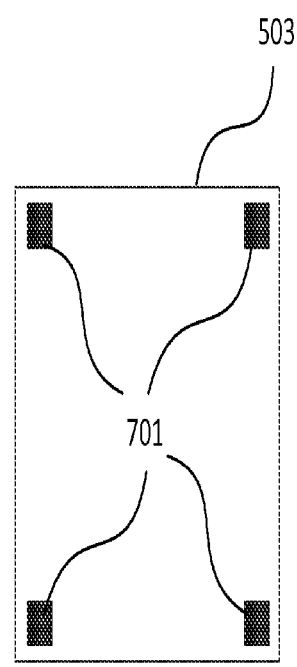

Referring now to FIGS. 7A through 7C, there are shown some examples of reference marks 701 as they may appear on a face 503 of a cube-shaped component 402 such as a block. As shown in FIG. 7A, known distances between reference marks 701 can be used to determine relative position and orientation of the component 402 from a camera or scanner (not shown). Such reference marks 701 may be placed on faces 503 in addition to machine-readable codes 601 as described above; however, such machine-readable codes 601 are omitted from FIGS. 7A through 7C for clarity.

As shown in FIG. 7B, in at least one embodiment, mark 701 positioned at each corner of face 503 can be shaped and oriented so that it points to its associated geometric corner. Such an approach can facilitate the resolution of separate, individual faces 503 when an observation may include multiple faces or an incomplete view of one or more faces 503 and/or codes. In such instances, the creation of a point cloud of data points from reference marks 701, each mark 701 representing an associated geometric point, can yield a set of points that may be challenging to resolve correctly into separate faces 503. One reason for this is that spatial datum indicating a corner location does not necessarily indicate how the surfaces that define it converge. Put into mathematical terms, if one has only knowledge of a single corner point for a three-dimensional cube, the valid positions for any of the three faces 503 whose intersection defines the corner point consist of the full range of possible positional solutions of the cube rotated about the corner point in all three dimensions. Accordingly, the use of reference marks 701 to provide indication of a face's 503 direction of extension relative the marked point can facilitate resolution of faces 503 from a point cloud of reference points.

In some cases, reference marks 701 on separate faces 503 may be situated in close proximity such that observation from particular vantages may yield difficulty identifying a mark 701 or ambiguities about the reference point. For example, if a reference marking scheme uses marks 701 at corner locations on every face 503 of a cube, then the cube's orientation to a point of observation that presents a corner with more than one of its defining faces 503 visible will likewise reveal multiple reference marks 701. If the reference marks 701 extend fully to the local edges of the cube, then it may become difficult to resolve the resulting aggregate shape into separate reference marks 701. For this reason, it may be advantageous to offset reference marks 701 away from the edge of each face 503 (as shown in FIGS. 7A through 7C), so that observations that may include multiple reference marks 701 indicating the same point can be more easily identified as such.

The above-described techniques of marking corner points as a means of determining spatial characteristics of faces 503 is merely one example of an approach that can be used in connection with the present system and method. Other techniques can be used. For example, edges provide a basis for geometric delineation in a fashion similar to corner points, and line or edge detection provides an alternative means that may be pursued separately or in supplement to a corner marking scheme. Edge detection is well known in the art of image processing, and can be particularly useful in the context of the present system and method, particularly if the potential component geometries might be known in advance or may be obtained (by means such as a component ID code). In some instances, edges may offer advantages over corners, owing to their definition as a curve or vector rather than a point. In at least one embodiment, therefore, marking schemes may be directed toward highlighting edges in addition to corners or as an alternative to a corner marking approach.

Any suitable form can be used for marking surfaces with machine-readable codes 601 and/or reference marks 701. In at least one embodiment, color can be used to further aid in identifying particular component types or aspects thereof. In at least one embodiment, marking can be accomplished by applying ink (of any suitable color or combination of colors), and/or by texturing or relief, and/or by some material variation. In at least one embodiment, marks are applied to surfaces with an ink that is transparent in the visible spectrum, but visible at wavelengths of light outside the visible range such as ultraviolet or infrared frequencies. The advantage to this approach is that the marks are hidden from users and therefore do not distract or detract from the appearance of the components 402.

Since components 402 may have potentially complex surfaces and/or may have mechanical or other functionality, it is possible that some components 402 may have faces 503 lacking sufficient or convenient area on which to locate a machine-readable code 601 or reference mark(s) 701. In these instances, it may still be desirable for a component 402 to include a mechanism for validating the presence of a surface, such as face 503, despite an inability to support all or part of the identification marks (machine-readable code 601 or reference mark(s) 701) that would otherwise be present. In at least one embodiment, an indication is provided (in addition to or as part of machine-readable code 601 or reference mark(s) 701) that the code 601 and/or reference mark(s) 701 is/are incomplete. Such an approach can serve to curtail repeated observations of the surface in attempt to capture a complete machine-readable code 601.

Thus, in at least one embodiment, a pattern can be applied across the entirely available space on a particular face 503, wherein such pattern is distinct from the type of marks (machine-readable code 601 or reference mark(s) 701) applied in coding the component face 503; such pattern indicates an incomplete machine-readable code 601 or reference mark(s) 701. An example is a striped pattern whose orientation is 45° offset from the prevailing edge of face 503. An observation that detects this pattern can determine that the component face 503 is/are incomplete or present no encoded data, while also possibly delineating some portion of the geometric limits of that face 503. In this manner, the system can still obtain information that may be relevant toward developing a comprehensive understanding of the overall spatial positioning and orientation of the component 402 (as well as its relationship to other components 402 and to surface 407.

Using the techniques described herein, therefore, the system and method provide an environment that supports localization of mobile agents 104 operating on a working surface 407, and that facilitate interaction of such mobile agents 104 with components 402 such as blocks. The techniques described herein can be used to allow mobile agents 104 to determine position and/or orientation of such components 402 with respect to mobile agents 104, other components 402, and/or working surface 407 (which may itself be considered a component 402).

In at least one embodiment, each mobile agent 104 has an understanding of the limits of the operating environment and/or its position within said environment; thus, through the processes of identification and recognition of components 402 and their spatial disposition relative to the agent's 104 known position and orientation, each agent 104 is able to understand the spatial disposition of the components 402 in the context of the operating environment's limits and/or a global reference point (which may be, for example, a common origin point on working surface 407). Consequently, both working surface 407 and other components 402 constitute a structured environment that can together or separately support localization by mobile agents 104.

In various embodiments, the system can use either or both of the working surface 407 and the current knowledge of component arrangement, and/or can switch from one to the other. In one example, wherein a mobile agent 104 is tasked with moving a particular component 402 at a known location some distance from its current position, the system may plan a path which will take agent 104 to component's 402 location, preferably in a manner that will dispose agent 104 to lift, grip or otherwise take position of component 402 in a convenient fashion. While mobile agent 104 is either traveling to component's 402 location or moving with component 402 to its intended next location, agent 104 may make use of information encoded or otherwise marked for reference on working surface 407 (or with reference to a global position). Once mobile agent 104 is sufficiently close to component 402, however, agent's 104 position and orientation with respect to component 402 may become more relevant to the immediate task of capturing or manipulating component 402 than is mobile agent's 104 absolute position on working surface 407. The transition from an emphasis on monitoring a global position and orientation via the working surface to one directed at localizing instead with respect to component 402 identified for capture or manipulation may be based, for example, on recognizing the potential error present in the mapped location of targeted component 402. Relying on map data to direct mobile agent 104 to a proximate location of component 402 provides a means for mobile agent 104 to reach components 402 efficiently and reliably without line-of-sight. Once mobile agent 104 is within close distance to the component 402 such that determining component 402 position and orientation with respect to agent 104 via processing data provided through agent's 104 onboard sensors becomes possible, it may be preferable to switch to this approach until component 402 has been captured by agent 104. At such a point, mobile agent 104 may revert to localizing with respect to working surface 407 (or with respect to agent's 104 global position).

Similarly, placement of component 402 in its intended position and orientation may likewise involve a switch to preferentially localizing with respect to other components 402 potentially neighboring the intended final position and orientation of the component 402 carried by mobile agent 104. In such a case, the component's 402 spatial data can be established with accuracy to the limit of that supported by localization scheme of working surface 407, for example by a downward-pointed camera installed on the mobile agent and exploiting the known geometries of mobile agent's 104 geometries as well as those of the component 402 and any other components 402 relevant to the placed component's 402 final position (e.g., components 402 stacked beneath the location of the placed component 402).

In at least one embodiment, multiple mobile agents 104 may operate simultaneously on working surface 407, engaged in separate tasks or working cooperatively (or competitively, or in conflict with one another, whether simulated or actual). Regardless of whether mobile agents 104 are actively cooperating with one another, information derived through separate observations of working surface 407 can be combined into a single, global model of working surface 407 environment. Such an aggregation of data may yield a more comprehensive or more complete overview of all components 402 located in the relevant space of working surface 407 as well as more accurate information related to the respective position and orientation of said components 402. Presumably, if the system employs an architecture in which a virtual model of the physical space in which the mobile agents 104 are operating resides in a central node such as host device 108, then such a model can incorporate all relevant information related to all component types, positions, and orientations obtained separately via mobile agents 104 and/or other types of components 402 which may be equipped to provide such data in whole or part. In this manner, a comprehensive representation of the components 402 in the relevant vicinity of working surface 407 can be created. Such comprehensive representation can then be used in constructing and/or maintaining a virtual representation of components 402, working surface 407, and/or mobile agents 104, as well as for reconciling physical positions and orientations of components 402, working surface 407, and/or mobile agents 104 with corresponding virtual representations, as described in related U.S. Utility application Ser. No. 13/963,638 for "Integration of a Robotic System with One or More Computing Devices", filed on Aug. 9, 2013.

Because of the possibility that information regarding component type, position and/or location derived from separate mobile agents 104 may not agree precisely, in at least one embodiment a mechanism may be implemented for reconciling differences in constructing and maintaining a single representation of the operating environment. Data can be prioritized according to potential error, such that data with the lowest error carries greater weight in aggregating information from separate sources than does data with the larger error.

For example, suppose two mobile agents 104 observe the same component 402 from separate locations on working surface 407, one from a vantage close to component 402 and the other from a location farther away. If mobile agents 104 derive their own position and orientation information from working surface 407 with the same level of accuracy and both are employing the same camera imaging technology to observe component 402, then it is expected that mobile agent 104 positioned closer to component 402 will in most cases provide more reliable information regarding the spatial disposition of the mutually regarded component 402 than will agent 104 positioned farther away. Various factors may affect the quality of data in such an example, such as differences in viewing angle or if one mobile agent 104 is observing component 402 while moving, or if one has a partly obstructed view. Other differences may also exist in conditions of observation. In at least one embodiment, any or all of such factors can be taken into account in prioritizing data from the two sources.

One skilled in the art will recognize that other schemes can be used for prioritizing inconsistent data received from different sources.

In at least one embodiment, mobile agents 104 (and/or other components 402) engage in ongoing monitoring and/or exploration so as to construct and maintain an accurate virtual representation of the physical state of the environment including the working surface. In at least one embodiment, it may be expected that mobile agents 104 will be introduced to a space already populated with components 402. Also, in some situations, component 402 configurations may change in ways that are difficult to predict, such as when an assembly may collapse accidentally or is deconstructed deliberately. In either case, agents 104 may be configured to recognize discrepancies between the physical state and the virtual representation that has been constructed.

As discussed herein, in cases of conflict between the virtual representation and the physical positions of agents 104 and/or components 402, appropriate adjustments can be made to either or both of the physical positions and/or the virtual representation. Priority can be given to either the virtual or physical, as appropriate.

Figure 8:
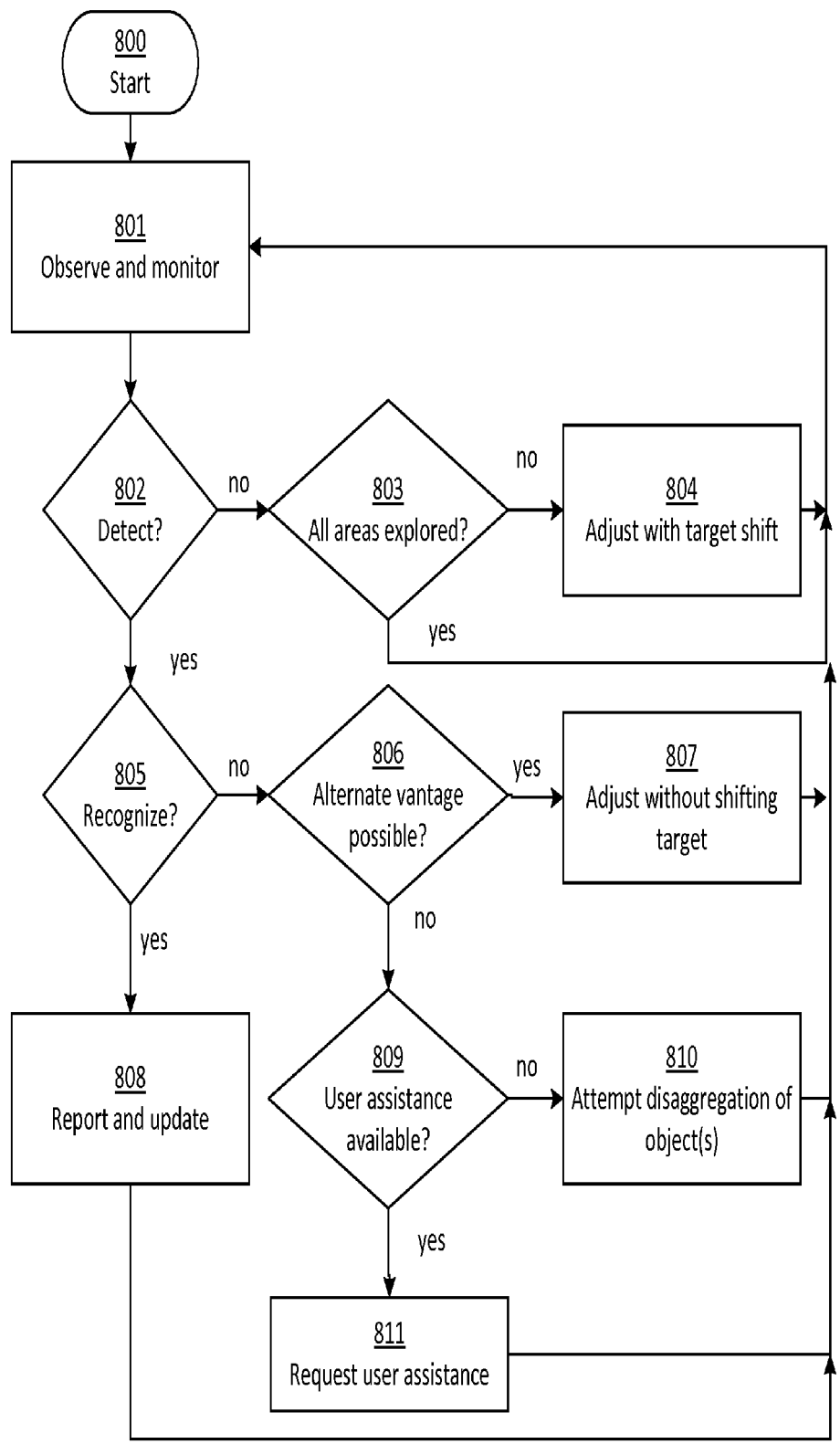
FIG. 8 is a flowchart depicting a method that mobile agents may employ on an ongoing basis to maintain parity between a virtual state and a physical state, according to one embodiment.

Referring now to FIG. 8, there is shown a flowchart describing a process that mobile agents 104 may employ on an ongoing basis to maintain parity between the virtual state and the physical state. Steps and functions depicted in FIG. 8 may be a mobile agent's 104 sole, distinct task, or they may be combined with other activities and may even be performed concurrently with such other activities. Additional techniques for such reconciliation are described, for example, in related U.S. Utility application Ser. No. 13/963,638 for "Integration of a Robotic System with One or More Computing Devices", filed on Aug. 9, 2013, which is incorporated herein by reference.

The method begins 800. Initially, mobile agent 104 is in an OBSERVE & MONITOR state 801, which may be implemented as a service function that may be performed concurrently with other tasks. While in this state, agent 104 is able to detect events and/or receive information from external sources, either from other mobile agents 104 or received through alternative forms of event notification. For example, mobile agent 104 may detect a sound consistent with falling components 402 or vibrations in the working surface picked up by an accelerometer.

In at least one embodiment, if in step 802, no event is detected, agent 104 determines 803 whether all areas of working surface 407 have been explored; if so, the method returns to OBSERVE & MONITOR state 801. If areas remain unexplored, in at least one embodiment, further exploration can be performed, for example by making certain adjustments 804 such as shifting position on working surface 407, changing orientation, and/or performing some other operations. The method then returns to OBSERVE & MONITOR state 801.

In response to detection 802 of an event, for example by mobile agent 104 detecting the presence of a component 402, component recognition step 805 begins. Here, mobile agent 104 attempts to recognize the component 402 whose state has changed. If a component 402 is successfully recognized, mobile agent 104 performs a REPORT & UPDATE step 808, wherein resulting information regarding component type, position and orientation are updated in the virtual representation of the physical space. Once the event has been reported, and the virtual environment updated accordingly 808, the method returns to OBSERVE & MONITOR state 801.

Detection 802 and recognition 805 can be performed in response to minor occurrences, such as when a component 402 position is modified slightly in response to superior observational data, or to more major occurrences, such as when a component 402 is moved a long distance, or when a scatter of fallen components 402 is suddenly detected on working surface 407, or when a stacked component 402 assembly suddenly disappears from its previous location as a consequence of collapse or unexpected removal.

If, in step 805, the detected component 402 is not successfully recognized, in at least one embodiment mobile agent 104 may determine 806 whether an alternative vantage point is possible; if so, agent 104 attempts to adjust 807 its vantage point, while maintaining its focus on the unrecognized component 402 until it has either identified component 402 or exhausted available vantages in which to do so. After adjusting 807, the method returns to step 801 so that detection 802 and recognition 805 can be attempted again.

In at least one embodiment, if no alternative vantage points are possible in step 806, mobile agent 104 may determine 809 whether user assistance may be available, and if so, request assistance 811 from a user (or other source). In at least one embodiment, such a request may be performed by notifying the user that there are aspects of the physical state that the system or its mobile agents 104 cannot recognize. In response to such notification, the user may be able to provide adequate resolution, for example by disaggregating a jumbled pile of blocks that would be otherwise recognizable and/or by removing non-block components 402 that may be present on working surface 407 (i.e., items foreign to the ecosystem of components 402 that are recognizable as blocks).

If, in step 809, user assistance is unavailable, mobile agent 104 may attempt 810 to execute the previously described disaggregation and removal process itself. For example, mobile agent 104 may use any suitable technique to determine when to cease attempts to identify a component 402 or other object and instead attempt to remove it from working surface 407 (by pushing it off, for example); such a decision may be made automatically by mobile agent 104 or host device 108, or some other component, based for example on reaching a predetermined number of failed attempts to identify component 402, and/or other criteria.

It should be noted that, in at least one embodiment, the process flow shown in FIG. 8 does not indicate completion, but rather a loop that returns to the OBSERVE & MONITOR step 801, although operation can end at any suitable time based on some trigger event, command, or other condition.

In at least one embodiment, any number of mobile agents 104 may simultaneously execute process flows similar to that depicted in FIG. 8; such parallel operation may result in a more accurate representation of the physical space in the environment of working surface 407 faster than would result from a single agent 104. The use of multiple agents 104 can provide opportunities for improved process flow. For example, in cases of an initial failure to recognize an object, multiple agents 104 can simultaneously collect and share observation data, increasing the likelihood of successful recognition of a component 402 or other object. Similarly, agents 104 can cooperate to facilitate improved efficiency when disaggregating components 402 or other objects.

Providing mobile agents 104 with the ability to detect changes in the physical state of the environment around working surface 407 allows the system and method to maintain coherence between the physical state and the virtual representation of it that is used as a basis for planning and execution of actions. Although robust capacity in this regard can yield favorable responsiveness to changes, a lag in detecting a change need not necessarily reduce the level of engagement the system elicits from a user. In fact, the time required for a mobile agent 104 to detect an unexpected or unplanned change in its environment can be a source of entertainment for users. One can imagine some users altering component 402 configuration or placement at a moment that a mobile agent 104 is not well disposed to detect the change event, and then waiting to see how long it will take for mobile agent 104 to detect the difference, recognize the change, and subsequently determine what action, if any, to take in response.

The operation of multiple mobile agents 104 relying on a shared representation of the working space lends itself toward organizing cooperation among mobile agents 104 to execute tasks. Accordingly, in at least one embodiment, a plurality of mobile agents 104 may individually contribute to a shared objective, or may share a task. For example, two mobile agents 104 might carry a single component 402 or an assembly of components 402 which by itself might be too bulky or too heavy or otherwise too unwieldy to be managed by a single mobile agent 104.

Figure 9:
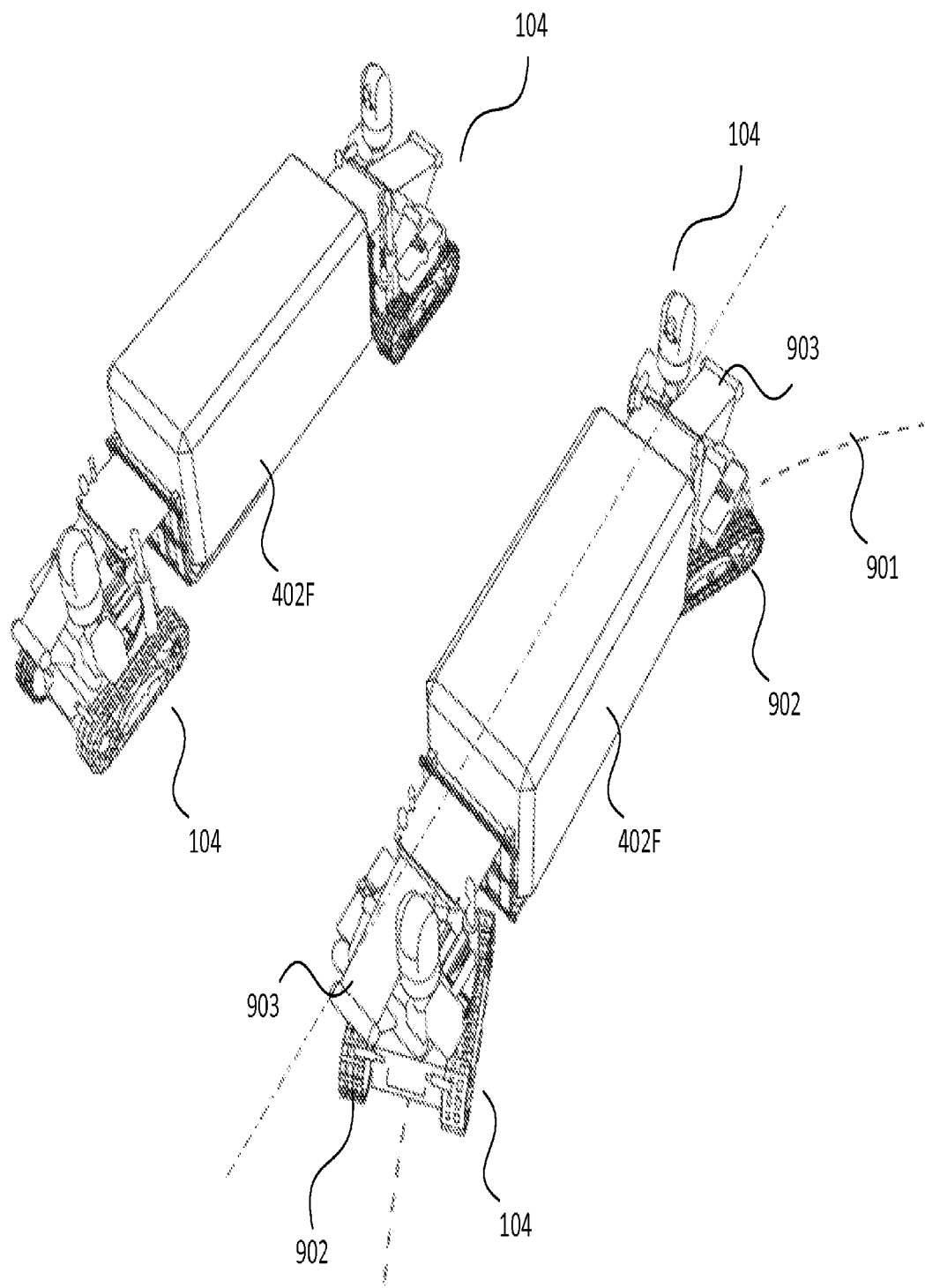
FIG. 9 depicts an example in which two mobile agents engage and lift a physical load each from either end and move in coordination to an intended location for their shared cargo, according to one embodiment.

Referring now to FIG. 9, there is shown an example in which two mobile agents 104 engage and lift a physical load (component 402F), each from either end of component 402F. Agents 104 then move in coordination to the intended location for their shared cargo. Such a task requires both planning and motion control, as well as mechanics that permit such collaboration. For example, as shown in the right-hand side of FIG. 9, moving component 402F along arc 901 requires steering operations to be coordinated between the two agents 104, as described in more detail below.

In various embodiments, the means of locomotion designed into mobile agents 104 can take any of several forms, including for example legged systems, rolling systems such as tracks or wheels, and/or the like. The particular locomotive techniques described and depicted herein are merely exemplary. In at least one embodiment, different agents 104 can have different locomotive means; in at least one embodiment, the system and method take into account the nature of the locomotive means for various mobile agents 104 (and their respective capabilities and/or limitations) in planning and executing actions, including cooperative actions.

In the current example of FIG. 9, it may be deemed important that the mobile agents have either an ability to move arbitrarily in any vector within the horizontal plane parallel to the working surface without rotating (such as a leg assembly with degrees of freedom analogous to a crab) or the ability to rotate their locomotion systems with respect to their hardware used to lift and control components 402. Thus, in at least one embodiment, the system takes into account such flexibility in considering how two mobile agents transporting a shared cargo would turn, as shown in the example of FIG. 9.

Specifically, as described above, FIG. 9 depicts two mobile agents 104 cooperate in transporting component 402F. The left-hand side of FIG. 9 shows an arrangement for transport in a straight line, while the right-hand side illustrates the importance of a mechanical system that permits rotation of each agent's 104 mobility system independent of its hoisting and carriage system when the path of travel deviates from a straight line (such as along arc 901). Universal legs 902 permit their rotation as a single cohesive unit while a moving platform 903 connected to a lifting system via a rotational joint allows tracked or wheeled agents 104 to serve as hinge points in the transport of shared cargo (such as component 402F). The particular system described herein provides unique advantages in addressing the complexity involved in coordinated transport of components 402; by using a network architecture based around a centralizing control in a peer device, the system and method are able to more easily coordinate such work among a number of mobile agents 104.

In some cases, spatial constraints in building component assemblies may preclude convenient placement of a component 402 at its final position. For example, if the intention is to slide a component 402 carried by two mobile agents 104 into a narrow space between two already-present components 402, then, depending on mechanical design and spatial configuration, it may not be possible for agents 104 to place the carried component 402 directly into its final position. In such instances, the planning system or method coordinating the motion of the two mobile agents 104 may, for example, cause mobile agents 104 to place the assembly at a convenient location near the final position and to subsequently position the assembly via some alternative means (such as single or coordinated pushing into the desired position).

Emotion

In at least one embodiment, the system provides a robust platform of situational awareness that can sustain learning, sophisticated interactions among mobile agents 104 as well as meaningful expressions of emotion in the course of executing their tasks. Such a response system may assume many forms. In some instances, the emotions may provide an added level of richness to the experience without substantially altering the underlying execution of tasks performed by mobile agents 104. In other cases, emotional responses to events may bear consequence on the sequence or execution of tasks whether in process or those planned.

Figure 10:
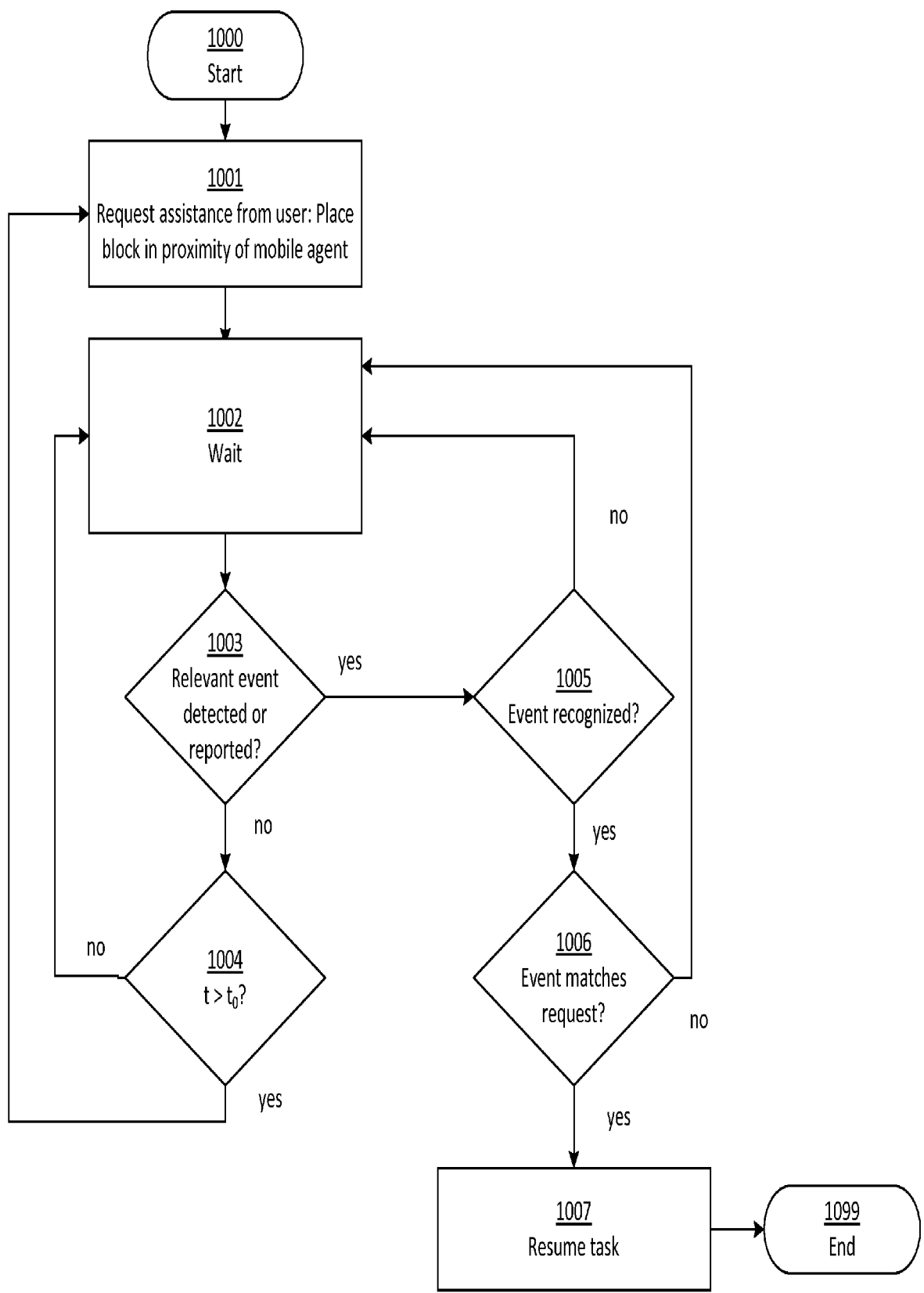
FIG. 10 is a flowchart depicting a scenario in which a mobile agent requests a component from a user, according to one embodiment.

Referring now to FIG. 10, there is shown a process flowchart outlining a scenario in which a mobile agent 104 requests a component 402 from a user, according to one embodiment. Initially, assistance is requested 1001 from the user, specifically asking the user to place a block at a certain location proximate to mobile agent 104. Once the request has been made, a waiting period begins 1002 during which agent 104 monitors events occurring on working surface 407, either through observation or reported by other mobile agents 104, or some combination thereof. Events are examined in comparison with the agent's 104 request, to determine if there is a match signifying the fulfillment of the request. If a relevant event is detected or reported 1003, and recognized 1005, and determined 1006 to match the request, then mobile agent 104 resumes 1007 the task that prompted the request for assistance at the outset of the process, and the method ends 1099.

If, in step 1005, the event is not recognized, or in step 1006, the event is determined to not match the request, then the method returns to step 1002.

During this process and until an event matching the request occurs, elapsed time is monitored 1004 against a limit, $t_a$; exceeding the limit prompts a return to step 1001, wherein the user is again asked for assistance.

Figure 11:
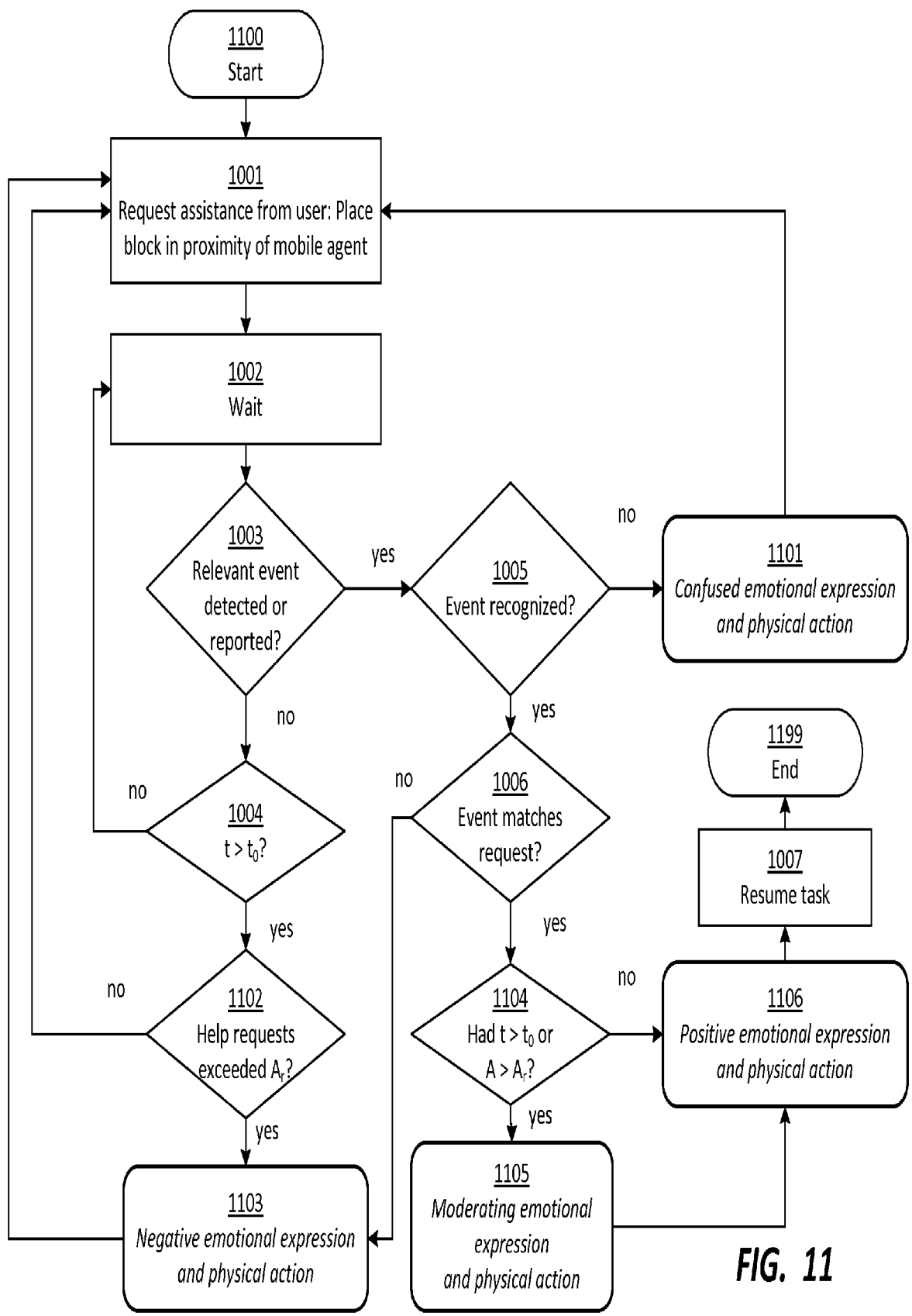
FIG. 11 is a flowchart depicting a scenario in which a mobile agent requests a component from a user, wherein the mobile agent can exhibit emotional states, according to one embodiment.

Referring now to FIG. 11, there is shown a process that supports the same outcomes as shown in FIG. 10, but includes emotional considerations as additional outcomes and/or states. The introduction of these potential emotional responses and/or states provides for a more complex interaction in this example. In some cases, these new outcomes are not the same as the expected outcome that would occur in the absence of an emotional state (as described above in connection with FIG. 10). In the genre of entertainment products, such unexpected results can be appreciated for the surprise and diversity they may represent.

In the present example, the emotional states that may be provided in connection with the task are identified under broad categories (positive, negative, moderating and confused), although these are presented solely as examples. One will appreciate that the particular states that can be presented, and how they are embodied, can vary.

In addition, in at least one embodiment, such emotional considerations can influence parameters such as, for example, how long an agent 104 is willing to wait ($t_a$) or how many times a request may be repeated ($A_r$). Since emotions may manifest themselves in many different ways, other embodiments can provide and implement other emotional responses, including simulations of personality.

Referring now also to FIG. 2, there is shown a table 201 depicting a set of responses and parameters that inform actions at various steps in the process according to a generalized personality type. For instance, a mobile agent 104 fitting the "extroverted positive" personality type exhibits emotional responses that exhibit greater patience, friendlier engagement and is more likely to yield the favored outcome than a mobile agent whose personality profile is "sensitive negative".

Such responses can be directly applicable to the method depicted above in connection with FIG. 11. If no event is detected 1003 while the mobile agent is in the WAIT state, the method checks 1004 whether elapsed time has reaches some predetermined duration $t_a$; once $t_a$ has been reached, the method determines 1102 whether the number of help requests made to the user exceeds some predetermined quantity $A_r$. If the number of help requests has not yet exceeded $A_r$, then the method returns to step 1001 to repeat the request. If, in step 1102, the number of help requests has exceeded $A_r$, then agent 104 exhibits 1103 a negative emotional expression and/or physical action, and the method ends 1199. Examples of negative emotional expression and/or physical actions for the various personality types are shown in table 201 of FIG. 2.

As shown in the table of FIG. 2, $t_a$ and $A_r$ can vary depending on the personality type of mobile agent 104. In this manner, duration during which an extroverted positive mobile agent 104 will wait before repeating the original request may be made longer than the duration a sensitive negative mobile agent 104 will wait, and neither will wait as long as a reserved positive mobile agent 104 will wait. Similarly, a sensitive negative mobile agent 104 will not repeat the original request ($A_r=1$) after $t_a$ is reached and will instead respond to the unsatisfied request with a Negative Emotional Expression and/or Negative Physical Action 1103.

FIG. 11 also includes other instances in which an emotional expression and/or physical action can be exhibited. For example, if an event is detected or reported 1003, but the event is not recognized 1005, agent 104 can exhibit 1101 a confused emotional expression and/or physical action before returning to step 1001. As another example, if an event is detected 1003, recognized 1005, and determined 1006 to match the request, a determination is made 1104 as to whether the elapsed time t or the number of help requests A had previously exceeded the respective threshold value $t_a$ and $A_r$. If so, in at least one embodiment, agent 104 exhibits 1105 a moderating emotional expression and/or physical action and then exhibits 1106 a positive emotional expression and/or physical action before resuming 1107 its task. If the elapsed time t or the number of help requests A had not previously exceeded the respective threshold value $t_a$ and $A_r$, then agent 104 does not exhibit 1105 the moderating emotional expression and/or physical action, but merely proceeds directly to the positive emotional expression and/or physical action before resuming 1107 its task. Other variations are possible, depending on particular characteristics and events.

FIG. 2 describes what actions constitute various types of responses for different personality types of mobile agents 104. In general, the personality types profiled in the table can serve as shorthand designation for the responses and parameters associated with each one.

Figure 3:
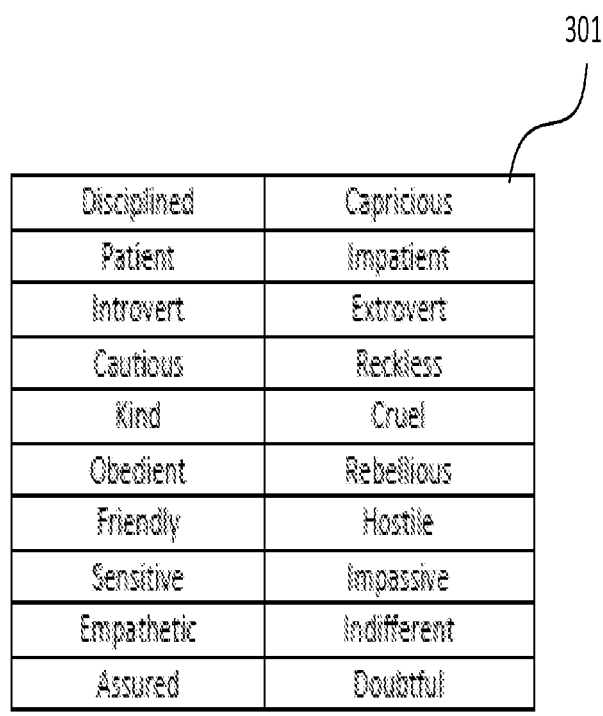
FIG. 3 is a table depicting a set of emotional characteristics that can be defined in terms of points on a scale between opposing characteristics, according to one embodiment.

The table in FIG. 2 is intended to serve as an example; one skilled in the art will recognize that many different approaches can be used when defining personalities and according tendencies or traits to them according to the techniques described herein. In the example of FIG. 2, a table provides set responses corresponding to particular steps or states in a process flow. Other representations are possible, however; for example, in another embodiment, personality parameters can be defined in terms of points on a scale between opposing characteristics. Referring now to FIG. 3, there is shown a table 301 setting forth a number of examples of characteristics that may be employed in such a scheme. Such an approach can yield a more diverse set of personalities than can generally be defined using discrete types.

Any number of characteristics can be used in defining the dimensions of personality. While a large number of parameters defining a personality type can yield subtleties that might elude a shorter set of parameters, the ability to understand how traits might combine into a global behavioral nature can be more difficult to grasp. In at least one embodiment, the system may impose constraints on the number of traits or correlations that can be assigned to a particular agent 104, so as to ensure that resulting behaviors are at least somewhat coherent (for example, to avoid defining a personality that is once fully disciplined and fully reckless, or one that is both fully impassive and fully extroverted).

The distillation of behavioral traits into a form that suits mathematical models that predict action has been the subject of an appreciable research in certain segments of the field of psychology. Modeling techniques for behavior and decisions are also known in the field of artificial intelligence. In at least one embodiment, the system makes use of a system to determine a mobile agent's 104 emotional disposition and emotional response to events occurring around it. The system serves to connect a dynamic system of emotions to events occurring in the physical environment, and further relates that system's impact on events occurring in the physical environment.

In at least one embodiment, emotional responses may play a significant role in the operation of the system described herein. Not only can the system impart emotive capacity to mobile agents 104 executing physical tasks, but it also can provide further functionality associated with the building structures created by such mobile agents 104.

In at least one embodiment, emotion can be incorporated in behaviors of mobile agents 104 in non-functional ways, for example to introduce sounds, gestures, or other actions and/or output that do not significantly affect the tasks being performed by agents 104. In other embodiments, however, emotions (defined, for example, by the personality profile of a mobile agent 104) can influence the functional operation of a mobile agent 104. By coupling the system of expressing emotions appropriate to a given situation with a mobile agent's 104 ability to perform tasks, the system is able to create an even more compelling projection of cognizance and personality. In at least one embodiment, parameters of personality can be made to serve as inputs into a model that includes potential actions available to a mobile agent 104, so as to affect behaviors of mobile agents 104 in functional and substantive ways, causing the results to diverge significantly from what is possible with a system that has no emotive component to it.

Figure 12:
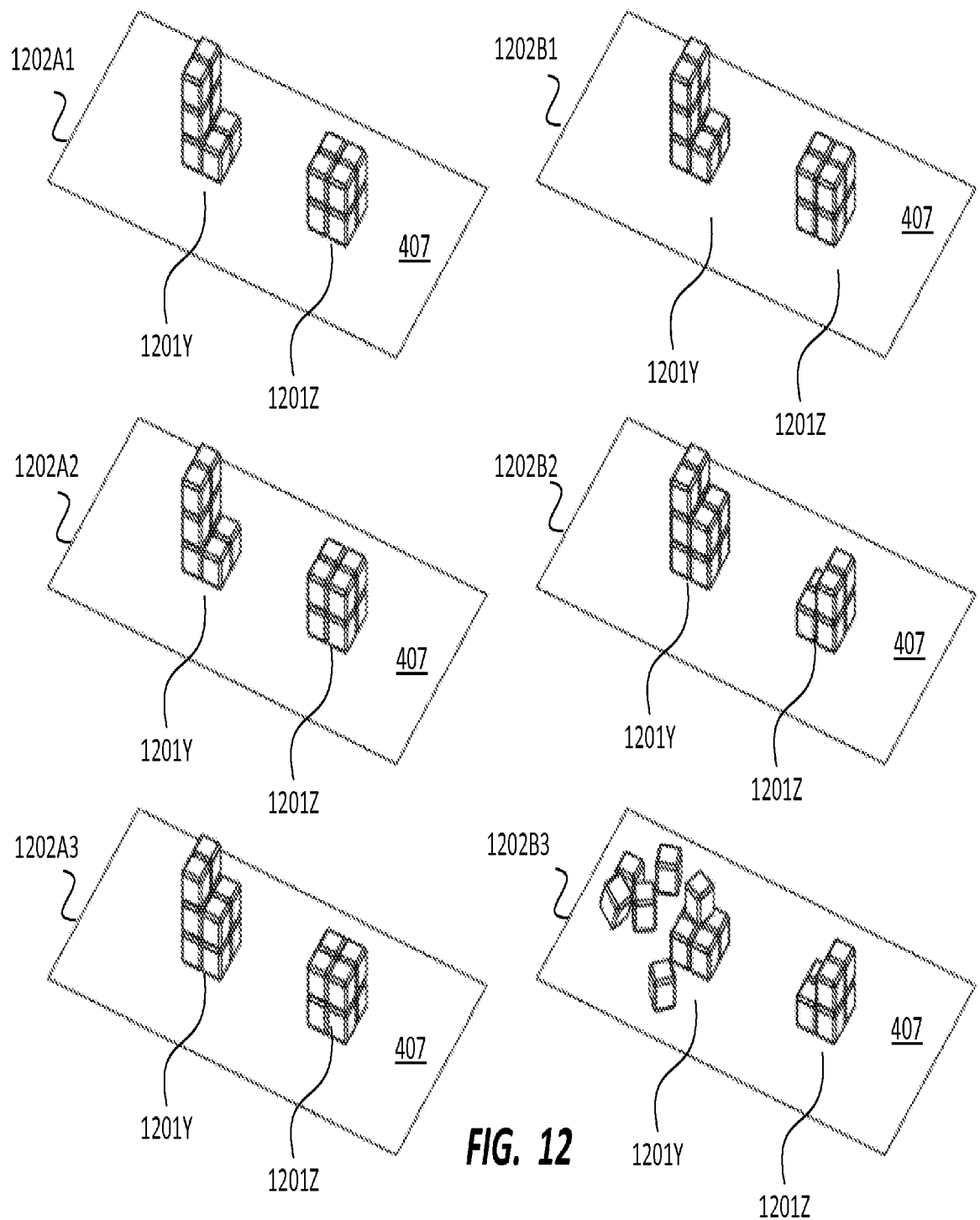
FIG. 12 depicts examples wherein a mobile agent requests a component from a user while in various states of construction, according to one embodiment.

Referring now to FIG. 12, there is shown an example wherein a mobile agent 104 requests a component 402 from a user. As shown in the Figure, there are six states 1202 of constructed components 402, each with two separate component assemblies 1201Y, 1201Z. In this scenario, each component assembly 1201Y, 1201Z is the result of a different mobile agent's 104 ongoing work, and the assembly 1201Y on the left side is under construction by a robot that requests a component 402 from a user. Each of the six states 1202 portrays different instances of construction. The left-hand column of states 1202A1, 1202A2, 1202A3 is a progressive sequence of construction stages in which emotions do not influence the course of tasks executed by mobile agents. The right-hand column of states 1202B1, 1202B2, 1202B3 is a similar progression, but one in which mobile agents 104 display (or model) emotions that potentially influence their course of action.

States 1202A1 and 1202B1 are identical and indicate a matching starting point for this example. In both scenarios, a mobile agent 104 constructing the component assembly 1201Y on the left signals a request to a user for two components 402 to add to its assembly 1201Y; in both scenarios, the user does not respond within the time limit dictating how long the mobile agent will wait before repeating the request (as described above in connection with FIG. 11).

On the left-hand side of FIG. 12, the consequence of the delay is apparent in the absence of new construction from state 1202A1 to state 1202A2. The mobile agent 104 repeats its request (per the method of FIG. 11) and continues to wait.

On the right-hand side of FIG. 12, however, mobile agent's 104 course of action is affected by its emotional response to the long wait time. For purposes of illustration, it is convenient to a imagine that the characteristics defining the personality profile of a mobile agent 104 include scaling traits such as "disciplined" on one end of a scale and "capricious" as its opposing limit, or "empathetic" and "indifferent" as opposite limits. In the depicted example, the mobile agent requesting the component 402 is described by a parametric setting that is substantially closer to capricious than to disciplined and likewise closer to aloof than to empathetic, as well as demonstrating tendencies closer to "rebellious" than to "obedient". Accordingly, this combination of settings is likely to describe a personality more inclined to disregard proper process in the execution of its primary task.

In the example, the system allows emotional responses to influence actions taken in the physical environment. Thus, from initial state 1202B1, the mobile agent 104 having the above-described characteristics is less likely to endure a lengthy wait for a user to provide requested component(s) 402. The mobile agent 104 might recognize that the neighboring assembly 1201Z contains components 402 that match those it requested from the user. Given its emotional disposition and a control system that permits its personality traits (i.e., rebellious, indifferent and capricious) to influence its decisions, the mobile agent 104 may be inclined to steal the components 402 from neighboring assembly 1201Z to place in its own assembly 1201Y. State 1202B2 indicates the result of such an action, in which two components 402 from assembly 1201Z have been placed into assembly 1201Y. The consequence of such an action exhibits how a system that enables emotional response to influence the planning and execution of physical action can sharply affect the course of events planned according to non-emotional considerations (e.g., efficiency).

One can appreciate that the emotional influences in the described example can persist through the sequence of all subsequent events. For example, if the mobile agent 104 engaged in building assembly 1201Z (from component(s) 402 have been stolen) has a personality profile of short temperament and capriciousness, the agent 104 may recognize the act of theft (afforded by the larger system's monitoring of all events and actions taken by mobile agents), and may retaliate. Accordingly, in state 1202B3, assembly 1201Y has been dismantled or destroyed, a potential outcome when a short-tempered neighbor agent 104 responds physically and vindictively to a mobile agent 104 having stolen components 402 from its assembly 1201Z for use in assembly 1201Y.

A comparison of states 1202A3 and 1202B3 illustrates how the introduction of an emotional system responsive to physical events to the planning and execution activities of mobile agents 104 can alter the course of events in the physical environment. State 1202A3 is the end state of a system adhering to processes focused solely achieving a planned end state. State 1202B3 exhibits a case in which the emotional dispositions ascribed to mobile agents 104 are permitted to influence their individual planning and execution of tasks. In State 1202A3, a delay in a user satisfying a mobile agent's 104 request for components 402 would likely only delay the execution of the mobile agent's 104 intended use for the components 402. By contrast, in state 1202B3, a mobile agent 104 displays emotional characteristics such as impatience and a weak notion of discipline and empathy; this has prompted events that led to a state 1202B3 that is farther away from the goal achieved in State 1202A3.

In at least one embodiment, mobile agents 104 may assume many different forms and may also assume specialized roles; for example, a mobile agent 104 may have a primary role of supervision. In one capacity, such supervision may be useful for the coordination of numerous mobile agents 104 engaged in a task that is particularly complex relative to the capability of the individual agents 104. In at least one embodiment, mobile agents 104 serving a supervisory role may provide a quelling or remediating effect on mobile agents 104 who might have fallen into dispute over the actions of one or both, a potentially important role if one or more of the agents 104 have personality profiles that would yield volatile tendencies.

An agent 104 can perform a supervisory role by any suitable means; for example, it can observe behavior of other agents 104 based on physical proximity and/or line-of-sight to a team of agents 104 working in collaboration or within the same space. As discussed above, in at least one embodiment, the system maintains a virtual model that tracks the location of agents 104 in space; accordingly, the system can use such a model to determine whether a supervisory agent 104 is within a critical threshold distance of a potentially volatile group of agents 104. Other techniques can also be used, for example by ascribing a probability to the efficacy of a supervisory agent 104 that varies with distance, or by combining distance with line-of-sight such that the ability of a supervisory agent 104 to maintain order among other and potentially unruly or conflicting agents 104 relies both on proximity and whether the supervisory agent has the agents under supervision within its field of view. Probabilistic determinations may also factor in additional elements, such as the temperament of an agent 104 who may be inclined to act out; for example, agents 104 that might be in more volatile states might be more likely to act out despite the relative proximity of a supervisory agent 104. In this fashion, the similarities to stereotypes of humans acting badly become evident: an agent 104 may be more likely to exhibit negative behaviors or act against another agent 104 if the supervisory agent 104 is far enough away or otherwise unable to supervise effectively (for example, if it is in reasonable proximity but the focus of its attention (e.g., camera or imager or general orientation of the agent) is directed elsewhere).

In the descriptions provided herein, the term "emotion" encompasses a variety of facets related to a mobile agent's 104 expressions and actions that are not likely to be a critical part of its intended task. These might include, for example, indications of satisfaction or discouragement, or they might manifest themselves in a way that bears direct physical consequence on the course of planned events. For example, as described above in connection with FIG. 12, unfavorable responses can disrupt the progress of an intended task or a series of tasks. Accordingly, in at least one embodiment, the system can make the implementation of certain tasks (such as construction of a component assembly) less predictable and therefore more surprising and interesting, particularly when multiple mobile agents 104 of variable personalities are participating in the undertaking of the task.

As described above, in some situations, inter-agent personality conflicts may confound progress toward a desired goal. In other situations, non-confrontational scenarios can occur where the interactions among agents 104 having personalities can be beneficial or detrimental. For example, mobile agents 104 that are assigned strong characteristics of impatience and recklessness may transport components 402 at greater speed and place them with less caution. The result may be faster completion of a structure, or slower construction owing to collapse events (or other destructive events) resulting from excessive haste and carelessness, requiring portions to be rebuilt.

Moreover, one can also consider circumstances which present risky opportunities, such as an assembly collapse that results in a component 402 tumbling beyond the perimeter edge of the working surface. As discussed earlier, mobile agents 104 can use component faces 503 as landmarks to supplement localization based on working surface 407. In this instance, a mobile agent 104 might leave the bounds of working surface 407 in pursuit of an errant component 402, relying on the component face 503 for navigation and likewise on components 402 on the working surface for navigation on the return trip. However, departing the working surface presents considerable risk since the nature of the navigable surface is unknown to the mobile agent 104. Accordingly, a "daring" mobile agent 104 (such as one that has some strong combination of reckless, undisciplined and capricious traits) might venture off working surface 407 and either successfully return or be lost in the process. More obedient and cautious mobile agents 104 might request help from the user to retrieve the component 402, or deem the component 402 as unreachable, rather than venturing off working surface 407.

In at least one embodiment, mobile agents 104 can learn or develop associations to their "experiences", and can apply such associations to their subsequent actions, in combination with planning and emotional responses. In this manner, such learning supplements the above-described capabilities of component 402 localization and communication among system components 402. A working knowledge of all components 402 on working surface 407, as well as functions that dictate emotional response, are in combination a robust basis for building a functional system for learning in meaningful way. In this respect, learning may assume the context of skills.

For example, in at least one embodiment, mobile agents 104 deployed for the first time might have a capacity for manipulating and transporting components 402 that is deliberately limited. After some period of time, agents 104 can acquire experience that causes their skill set to increase, for example based on cumulative operation time or the number of times simple actions are repeated. In at least one embodiment, the rate at which a mobile agent's 104 skill set expands can be tied directly to how much a user pushes the limits of the agent's 104 capabilities in developing designs for them to build.

In at least one embodiment, future behavior can be tied to specific events in the past of mobile agents 104. For example, an agent 104 might proceed with greater caution in an assembly step that, in a past experience, resulted in an unfavorable event such as collapse. In at least one embodiment, an agent 104 can learn from past experience by, for example, adjusting its tendency to take risks based on the degree to which bolder actions in the past have led to favorable or unfavorable results.

In at least one embodiment, agents 104 can have affinities or relationships with one another, so that experiences of a first agent 104 can affect future behavior of other agent(s) 104, such as those agent(s) 104 with whom the first agent 104 has an affinity or relationship.

Learning can also be applied to inform or influence the future behavior of mobile agents 104 in the realm of emotional response. Returning to the example shown in FIG. 12, in which one mobile agent 104 stole components 402 from the assembly of a second mobile agent 104: once the first mobile agent 104 sees the response of the second mobile agent 104 (knocking down the assembly of the first mobile agent 104), the first mobile agent 104 may change its behavior in the presence of the second mobile agent 104 in later encounters. In fact, both agents 104 may change their future behavior with respect to one another based on the previous interaction, for example to simulate a reluctance to cooperate with one another or even a degree of animosity or resentment toward one another.

In at least one embodiment, the degree to which such behavior changes manifest can depend on characteristics imputed to the agents' 104 personalities and functions that determine response based on those characteristics. A mobile agent 104 with a high degree of patience, for example, may alter its behavior only very slightly, if at all, in a subsequent encounter with a mobile agent 104 that had previously disrupted its operation. A less patient agent 104 may more quickly react to a negative action taken by another agent 104. In addition, in at least one embodiment, new experiences can shift dispositions and the effects of a single event can be made to fade in time without reinforcement by repetition.

The above description and referenced drawings set forth particular details with respect to possible embodiments. Those of skill in the art will appreciate that other embodiments are possible. First, the particular naming of the components, capitalization of terms, the attributes, data structures, or any other programming or structural aspect is not mandatory or significant, and the mechanisms described herein may have different names, formats, or protocols. Further, the system may be implemented via a combination of hardware and software, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment. The appearances of the phrases "in one embodiment" or "in at least one embodiment" in various places in the specification are not necessarily all referring to the same embodiment.

Some embodiments may include a system or a method for performing the above-described techniques, either singly or in any combination. Other embodiments may include a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions can be embodied in software, firmware and/or hardware, and when embodied in software, can be downloaded to reside on and be operated from different platforms used by a variety of operating systems.

Some embodiments relate to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, DVD-ROMs, magnetic-optical disks, read-only memories (ROMs), random access memories (RAMs), EPROMs, EEPROMs, flash memory, solid state drives, magnetic or optical cards, application specific integrated circuits (ASICs), or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the system and method set forth herein are not described with reference to any particular programming language. It will be appreciated that a variety of programming languages may be used to implement the teachings described herein, and any references above to specific languages are provided for illustrative purposes only.

Accordingly, various embodiments may include software, hardware, and/or other elements for controlling a computer system, computing device, or other electronic device, or any combination or plurality thereof. Such an electronic device can include, for example, a processor, an input device (such as a keyboard, mouse, touchpad, track pad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or non-portable. Examples of electronic devices that may be used include: a mobile phone, personal digital assistant, smartphone, kiosk, server computer, enterprise computing device, desktop computer, laptop computer, tablet computer, consumer electronic device, or the like. An electronic device for implementing the system or method described herein may use any operating system such as, for example and without limitation: Linux; Microsoft Windows, available from Microsoft Corporation of Redmond, Wash.; Mac OS X, available from Apple Inc. of Cupertino, Calif.; iOS, available from Apple Inc. of Cupertino, Calif.; Android, available from Google, Inc. of Mountain View, Calif.; and/or any other operating system that is adapted for use on the device.

While a limited number of embodiments has been described herein, those skilled in the art, having benefit of the above description, will appreciate that other embodiments may be devised which do not depart from the scope of the claims. In addition, it should be noted that the language used in the specification has been principally selected for readability and instructional purposes, and may not have been selected to delineate or circumscribe the inventive subject matter. Accordingly, this disclosure is intended to be illustrative, but not limiting.

What is claimed is:

1. A robot comprising:
one or more actuators that are each configured to effect a physical movement of the robot;
one or more processors; and
one or more storage devices storing instructions that are operable, when executed by the one or more processors, to cause the robot to perform operations comprising:
prompting a user for a particular input;
obtaining a first personality parameter assigned to the robot, the first personality parameter being one of a plurality of maintained personality parameters;
obtaining a first emotion-specific action to which the first personality parameter is mapped for the prompted input;
determining that a user input does not match the prompted input; and in response to determining that a user input does not match the prompted input, executing the first emotion-specific action including issuing commands to the one or more actuators to cause the robot to perform one or more physical movements corresponding to the first emotion-specific action.

2. The robot of claim 1, wherein the personality parameter is extroverted positive, sensitive positive, reserved positive, reserved neutral, cynical negative, or sensitive negative.

3. The robot of claim 1, wherein the first emotion-specific action is a negative action to which the first personality parameter is mapped for the prompted input.

4. The robot of claim 3, wherein the operations further comprise prompting a user for a particular input after determining that a user input does not match the prompted input.

5. The robot of claim 1, wherein prompting a user for a particular input comprises requesting assistance from the user.

6. The robot of claim 1, wherein prompting a user for a particular input comprises requesting speech input from the user.

7. The robot of claim 1, wherein requesting assistance comprises requesting the user to place something in front of the robot.

8. The robot of claim 1, wherein the personality parameter is represented as a value on a scale between opposing personality characteristics.

9. The robot of claim 1, wherein the first emotion-specific action conveys anthropomorphic properties.

10. A non-transitory computer storage medium storing thereon a computer program product for controlling a robot, comprising computer-executable instructions executed on a computer to perform operations comprising:
prompting a user for a particular input;
obtaining a first personality parameter assigned to the robot, the first personality parameter being one of a plurality of maintained personality parameters;
obtaining a first emotion-specific action to which the first personality parameter is mapped for the prompted input;
determining that a user input does not match the prompted input; and
in response to determining that a user input does not match the prompted input, executing the first emotion-specific action including issuing commands to the one or more actuators to cause the robot to perform one or more physical movements corresponding to the first emotion-specific action.

11. The non-transitory computer storage medium of claim 10, wherein the personality parameter is extroverted positive, sensitive positive, reserved positive, reserved neutral, cynical negative, or sensitive negative.

12. The non-transitory computer storage medium of claim 10, wherein the first emotion-specific action is a negative action to which the first personality parameter is mapped for the prompted input.

13. The non-transitory computer storage medium of claim 12, wherein the operations further comprise prompting a user for a particular input after determining that a user input does not match the prompted input.

14. The non-transitory computer storage medium of claim 10, wherein prompting a user for a particular input comprises requesting assistance from the user.

15. The non-transitory computer storage medium of claim 10, wherein prompting a user for a particular input comprises requesting speech input from the user.

16. The non-transitory computer storage medium of claim 10, wherein requesting assistance comprises requesting the user to place something in front of the robot.

17. The non-transitory computer storage medium product of claim 10, wherein the personality parameter is represented as a value on a scale between opposing personality characteristics.

18. The non-transitory computer storage medium of claim 10, wherein the first emotion-specific action conveys anthropomorphic properties.

19. A robot comprising:
one or more actuators that are each configured to effect a physical movement of the robot;
one or more processors; and
one or more storage devices storing instructions that are operable, when executed by the one or more processors, to cause the robot to perform operations comprising:
prompting a user for a particular input;
obtaining a first personality parameter assigned to the robot, the first personality parameter being one of a plurality of maintained personality parameters;
obtaining a first emotion-specific action to which the first personality parameter is mapped for the prompted input;
determining that a received user input is not recognized; and
in response to determining that a received user input is not recognized, executing the first emotion-specific action including issuing commands to the one or more actuators to cause the robot to perform one or more physical movements corresponding to the first emotion-specific action.

20. The robot of claim 19, wherein the personality parameter is extroverted positive, sensitive positive, reserved positive, reserved neutral, cynical negative, or sensitive negative.

21. The robot of claim 19, wherein the first emotion-specific action is a confused action to which the first personality parameter is mapped for the prompted input.

22. The robot of claim 21, wherein the operations further comprise prompting a user for a particular input after determining that a received user input is not recognized.

23. The robot of claim 19, wherein the operations further comprise prompting a user for a particular input after determining that a user input does not match the prompted input.

24. The robot of claim 19, wherein prompting a user for a particular input comprises requesting assistance from the user.

25. The robot of claim 19, wherein prompting a user for a particular input comprises requesting speech input from the user.

26. The robot of claim 19, wherein requesting assistance comprises requesting the user to place something in front of the robot.

27. The robot of claim 19, wherein the personality parameter is represented as a value on a scale between opposing personality characteristics.

28. The robot of claim 19, wherein the first emotion-specific action conveys anthropomorphic properties.

29. A non-transitory computer storage medium storing thereon a computer program product for controlling a robot, comprising computer-executable instructions executed on a computer to perform operations comprising:
   prompting a user for a particular input;
   obtaining a first personality parameter assigned to the robot, the first personality parameter being one of a plurality of maintained personality parameters;
   obtaining a first emotion-specific action to which the first personality parameter is mapped for the prompted input;
   determining that a received user input is not recognized; and
   in response to determining that a received user input is not recognized, executing the first emotion-specific action including issuing commands to the one or more actuators to cause the robot to perform one or more physical movements corresponding to the first emotion-specific action.

30. The non-transitory computer storage medium of claim 29, wherein the personality parameter is extroverted positive, sensitive positive, reserved positive, reserved neutral, cynical negative, or sensitive negative.

31. The non-transitory computer storage medium of claim 29, wherein the first emotion-specific action is a confused action to which the first personality parameter is mapped for the prompted input.

32. The non-transitory computer storage medium of claim 31, wherein the operations further comprise prompting a user for a particular input after determining that a received user input is not recognized.

33. The non-transitory computer storage medium of claim 29, wherein the operations further comprise prompting a user for a particular input after determining that a user input does not match the prompted input.

34. The non-transitory computer storage medium of claim 29, wherein prompting a user for a particular input comprises requesting assistance from the user.

35. The non-transitory computer storage medium of claim 29, wherein prompting a user for a particular input comprises requesting speech input from the user.

36. The non-transitory computer storage medium of claim 29, wherein requesting assistance comprises requesting the user to place something in front of the robot.

37. The non-transitory computer storage medium of claim 29, wherein the personality parameter is represented as a value on a scale between opposing personality characteristics.

38. The non-transitory computer storage medium of claim 29, wherein the first emotion-specific action conveys anthropomorphic properties.

* * * * *